United States Patent
DeSilva et al.

(10) Patent No.: US 9,746,360 B2
(45) Date of Patent: Aug. 29, 2017

(54) NONINTRUSIVE PERFORMANCE MEASUREMENT OF A GAS TURBINE ENGINE IN REAL TIME

(71) Applicant: Siemens Energy, Inc., Orlando, FL (US)

(72) Inventors: Upul P. DeSilva, Oviedo, FL (US); Heiko Claussen, North Brunswick, NJ (US)

(73) Assignee: Siemens Energy, Inc., Orlando, FL (US)

( * ) Notice: Subject to any disclaimer, the term of this patent is extended or adjusted under 35 U.S.C. 154(b) by 536 days.

(21) Appl. No.: 14/341,950

(22) Filed: Jul. 28, 2014

(65) Prior Publication Data

US 2015/0260557 A1 Sep. 17, 2015

Related U.S. Application Data

(63) Continuation-in-part of application No. 14/207,803, filed on Mar. 13, 2014.

(51) Int. Cl.
  *G01F 25/00* (2006.01)
  *G01F 1/66* (2006.01)
  *G01M 15/14* (2006.01)

(52) U.S. Cl.
  CPC .............. *G01F 1/66* (2013.01); *G01M 15/14* (2013.01); *G01F 25/0007* (2013.01)

(58) Field of Classification Search
  CPC ......... F05D 2270/303; F05D 2270/804; F05D 2270/806; G01M 15/14; G01F 25/0007; G01F 1/6677; G01K 7/42
  USPC ......... 701/100; 702/45, 48, 50, 54, 79, 130, 702/142, 176; 374/141, 117–119, 120, 374/45, 147, 144; 73/861.18–861.31,
  (Continued)

(56) References Cited

U.S. PATENT DOCUMENTS 2,582,232 A 1/1952 Cesaro et al.
3,818,757 A 6/1974 Brown
(Continued)

FOREIGN PATENT DOCUMENTS

EP 113961 A1 7/1984
EP 125061 A 11/1984
(Continued)

OTHER PUBLICATIONS

All citations of non-patent literature are of related applications before the US Patent and Trademark Office: "Active Temperature Monitoring in Gas Turbine Combusters", filed Dec. 18, 2013, U.S. Appl No. 14/132,001.
(Continued)

*Primary Examiner* — William H Rodriguez

(57) ABSTRACT

Performance of a gas turbine engine is monitored by computing a mass flow rate through the engine. Acoustic time-of-flight measurements are taken between acoustic transmitters and receivers in the flow path of the engine. The measurements are processed to determine average speeds of sound and gas flow velocities along those lines-of-sound. A volumetric flow rate in the flow path is computed using the gas flow velocities together with a representation of the flow path geometry. A gas density in the flow path is computed using the speeds of sound and a measured static pressure. The mass flow rate is calculated from the gas density and the volumetric flow rate.

20 Claims, 9 Drawing Sheets

(58) Field of Classification Search
USPC ........ 73/204.11–204.27, 587, 597, 598, 602, 73/645, 660, 112.01
See application file for complete search history.

(56) References Cited

U.S. PATENT DOCUMENTS

| | | | |
|---|---|---|---|
| 4,320,666 | A | 3/1982 | Redding |
| 4,445,389 | A | 5/1984 | Potzick et al. |
| 4,676,665 | A | 6/1987 | Twerdochlib |
| 4,754,650 | A * | 7/1988 | Smalling ............... G01F 1/662 73/861.28 |
| 4,848,924 | A | 7/1989 | Nuspl et al. |
| 4,856,321 | A * | 8/1989 | Smalling ............... G01F 1/662 73/40.5 A |
| 4,955,004 | A | 9/1990 | Viscovich |
| 5,115,670 | A | 5/1992 | Shen |
| 5,168,699 | A | 12/1992 | McCarty et al. |
| 5,275,553 | A | 1/1994 | Frish et al. |
| 5,369,998 | A | 12/1994 | Sowerby |
| 5,546,813 | A | 8/1996 | Hastings et al. |
| 5,719,791 | A | 2/1998 | Neumeier et al. |
| 5,784,300 | A | 7/1998 | Neumeier et al. |
| 5,918,281 | A | 6/1999 | Nabulsi |
| 6,142,665 | A | 11/2000 | Haffner et al. |
| 6,202,494 | B1 | 3/2001 | Riebel et al. |
| 6,386,755 | B1 | 5/2002 | Draxton et al. |
| 6,389,330 | B1 | 5/2002 | Khesin |
| 6,480,750 | B2 | 11/2002 | Junk |
| 6,487,916 | B1 | 12/2002 | Gomm et al. |
| 6,494,105 | B1 | 12/2002 | Gallagher |
| 6,546,328 | B1 | 4/2003 | Slicker |
| 6,768,938 | B2 | 7/2004 | McBrien et al. |
| 6,850,836 | B1 | 2/2005 | Scholl |
| 6,952,639 | B2 | 10/2005 | Kumar et al. |
| 7,008,218 | B2 | 3/2006 | Zhang et al. |
| 7,013,210 | B2 | 3/2006 | McBrien et al. |
| 7,159,472 | B1 | 1/2007 | Hastings et al. |
| 7,191,073 | B2 | 3/2007 | Astley et al. |
| 7,202,794 | B2 | 4/2007 | Huseynov et al. |
| 7,278,266 | B2 | 10/2007 | Taware et al. |
| 7,380,470 | B2 | 6/2008 | Konzelmann et al. |
| 7,383,165 | B2 | 6/2008 | Aragones |
| 7,484,369 | B2 | 2/2009 | Myhre |
| 7,598,485 | B2 | 10/2009 | Csutak |
| 7,624,651 | B2 | 12/2009 | Fernald et al. |
| 7,636,639 | B2 | 12/2009 | Metcalf et al. |
| 7,731,420 | B2 | 6/2010 | Brummel |
| 7,752,918 | B2 | 7/2010 | Davis |
| 7,761,216 | B2 | 7/2010 | Norris et al. |
| 7,795,783 | B2 | 9/2010 | Trochesset et al. |
| 7,853,433 | B2 | 12/2010 | He et al. |
| 8,001,761 | B2 | 8/2011 | Myers, Jr. et al. |
| 8,047,082 | B2 | 11/2011 | Bierl et al. |
| 8,146,408 | B2 | 4/2012 | Snow |
| 2004/0011141 | A1* | 1/2004 | Lynnworth ............ G01F 1/667 73/861.27 |
| 2004/0194539 | A1* | 10/2004 | Gysling ................ G01F 1/667 73/61.45 |
| 2005/0011278 | A1 | 1/2005 | Brown et al. |
| 2005/0066744 | A1 | 3/2005 | Kupnik et al. |
| 2005/0132712 | A1 | 6/2005 | Krok et al. |
| 2005/0276306 | A1 | 12/2005 | Mick et al. |
| 2006/0137353 | A1 | 6/2006 | Lieuwen et al. |
| 2006/0248893 | A1 | 11/2006 | Mick et al. |
| 2007/0027607 | A1 | 2/2007 | Norris et al. |
| 2007/0062196 | A1 | 3/2007 | Gleeson et al. |
| 2007/0151363 | A1 | 7/2007 | Ramsesh |
| 2008/0010966 | A1 | 1/2008 | Taware et al. |
| 2008/0034753 | A1 | 2/2008 | Furman et al. |
| 2008/0208483 | A1* | 8/2008 | Loose ..................... G01F 1/666 702/22 |
| 2009/0178490 | A1 | 7/2009 | Konzelmann et al. |
| 2009/0183573 | A1 | 7/2009 | Fricke et al. |
| 2009/0241506 | A1 | 10/2009 | Nilsson |
| 2010/0076698 | A1 | 3/2010 | He et al. |
| 2010/0132375 | A1 | 6/2010 | Tanimura et al. |
| 2010/0276225 | A1 | 11/2010 | Busse et al. |
| 2010/0288055 | A1 | 11/2010 | Mueller et al. |
| 2011/0154821 | A1 | 6/2011 | Evans-Beauchamp |
| 2012/0150413 | A1 | 6/2012 | Bunce et al. |
| 2012/0204620 | A1 | 8/2012 | Straub, Jr. |
| 2014/0130606 | A1 | 5/2014 | Schwarz |
| 2014/0144156 | A1 | 5/2014 | Lang et al. |
| 2015/0063411 | A1 | 3/2015 | DeSilva et al. |
| 2015/0128723 | A1 | 5/2015 | Satou et al. |
| 2015/0168190 | A1 | 6/2015 | DeSilva et al. |
| 2015/0168230 | A1 | 6/2015 | DeSilva et al. |
| 2015/0185089 | A1 | 7/2015 | DeSilva et al. |
| 2015/0260557 | A1 | 9/2015 | DeSilva et al. |
| 2015/0260611 | A1 | 9/2015 | DeSilva et al. |
| 2015/0260612 | A1 | 9/2015 | DeSilva et al. |

FOREIGN PATENT DOCUMENTS

| | | |
|---|---|---|
| EP | 1602904 A1 | 5/2005 |
| EP | 2290343 A2 | 3/2011 |
| JP | 2001141578 A | 5/2001 |
| JP | 2002156294 A | 5/2002 |
| WO | 93/04343 A1 | 3/1994 |
| WO | 9958942 A1 | 11/1999 |
| WO | 2015/164313 A1 | 10/2015 |
| WO | 2015/164466 A1 | 10/2015 |

OTHER PUBLICATIONS

"Temperature Measurement in a Gas Turbine Engine Combustor", filed Mar. 14, 2013, U.S. Appl. No. 13/804,132.
"Active Measurement of Gas Flow Temperature, Including in Gas Turbine Combustors", filed Mar. 13, 2014, U.S. Appl. No. 14/207,741.
"Multi Functional Sensor System for Gas Turbine Combustion Monitoring and Control" filed Dec. 18, 2013, U.S. Appl. No. 14/109,992.
"Nonintrusive Transceiver and Method for Characterizing Temperature and Velocity Fields in a Gas Turbine Combustor" filed concurrently herewith, related application.
"Active Measurement of Gas Flow Velocity or Simultaneous Measurement of Velocity and Temperature, Including in Gas Turbine Combustors" filed Mar. 13, 2014, U.S. Appl. No. 14/207,803: CIP parent application.
John A. Kleppe, Jim Maskaly and Gary Beam, "The Application of Image Processing to Acoustic Pyrometry," Proceedings, Int'l Conf. on Image Processing (IEEE) (1996).
G.Q. Shen, L.S.An, and G.S. Jiang, "Real-time Monitoring on Boiler Combustion Based on Acoustic Measurement", Power India Conference, (IEEE) (2006).
Helmut Sielschott and Willy Derichs, "Use of collocation methods under inclusion of a priori information in acoustic pyrometry", Process Tomography—95 Implementation for Industrial Processes, Proc. European Concerted Action on Process Tomography, Bergen, Norway, Apr. 6-8, 1995.
International Search Report for International Application No. PCT/US2015/027020 mailed Jul. 16, 2015, 4 pages.
Written Opinion for International Application No. PCT/US2015/027020 mailed Jul. 16, 2015, 7 pages.
International Search Report for International Application No. PCT/US2015/026784 mailed Jun. 29, 2015, 3 pages.
Written Opinion for International Application No. PCT/US2015/026784 mailed Jun. 29 2015, 7 pages.
International Search Report for International Application No. PCT/US2015/020058 mailed Jun. 9, 2015, 4 pages.
Written Opinion for International Application No. PCT/US2015/020058 mailed Jun. 9, 2015, 8 pages.
Gustave C. Fralick; Acoustic Pyrometry Applied to Gas Turbines and Jet Engines; www.grc.nas.gov/WWW/RT/RT1998/5000/5510; 1998; 2 pages.
Gustave C. Fralick; Passive Acoustic Tomography Tested for Measuring Gas Temperatures; Research and Technology 2003; May 2004; NASA Glenn Research Center, Cleveland, OH.

(56) References Cited

OTHER PUBLICATIONS

Upul Desilva et al.; Novel Gas Turbine Exhaust Temperature Measurement System; Proceedings of the ASME Turbo Expo 2013; GT2013-95153; Jun. 3-7, 2013; 8 pages.

Olley P. et al.; The Development of Acoustic Tomography for Temperature Measurement in Fast Reactors; for presentation at the IAEA/IWGFR Specialist Meeting on Instrumentation for the Supervision of Core Cooling in LMFBR's at Kalpakkam, India: Dec. 12-15, 1989.

* cited by examiner

NONINTRUSIVE PERFORMANCE MEASUREMENT OF A GAS TURBINE ENGINE IN REAL TIME

CROSS-REFERENCE TO RELATED APPLICATIONS

This application is a continuation in part of United States Patent Application entitled "Active Measurement of Gas Flow Velocity or Simultaneous Measurement of Velocity and Temperature, Including in Gas Turbine Combustors", filed on Mar. 13, 2014, Ser. No. 14/207,803, US Patent Publication No. 2015/0168190, U.S. Pat. No. 9,556,791.

This application incorporates by reference the following co-pending United States utility patent applications in their entirety as if fully set forth herein:

"Nonintrusive Transceiver and Method for Characterizing Temperature and Velocity Fields in a Gas Turbine Combustor", Ser. No. 14/341,924, filed concurrently herewith, US Patent Publication No. 2015/0260611;

"Active Measurement of Gas Flow Temperature, Including in Gas Turbine Combustors", filed on Mar. 13, 2014, Ser. No. 14/207,741, US Patent Publication No. 2015/0168230;

"Active Temperature Monitoring in Gas Turbine Combustors", filed on Dec. 18, 2013, Ser. No. 14/132,001, US Patent Publication No. 2015/0168229, U.S. Pat. No. 9,453,767;

"Multi-Functional Sensor System for Gas Turbine Combustion Monitoring and Control" filed on Dec. 18, 2013, Ser. No. 14/109,992, US Patent Publication No. 2015/0168228, U.S. Pat. No. 9,568,378;

"Temperature Measurement In A Gas Turbine Engine Combustor", filed on Mar. 14, 2013, Ser. No. 13/804,132, US Patent Publication No. 2014/0278200; and "Gas Turbine Engine Control Using Acoustic Pyrometry", filed on Dec. 14, 2010, Ser. No. 12/967,148, US Patent Publication No. 2012/0150413, U.S. Pat. No. 8,565,999.

This application also incorporates by reference in its entirety as if fully set forth herein U.S. Pat. No. 7,853,433, "Combustion Anomaly Detection Via Wavelet Analysis Of Dynamic Sensor Signals", issued Dec. 14, 2010.

STATEMENT REGARDING FEDERALLY SPONSORED RESEARCH OR DEVELOPMENT

Temperature mapping portions of this invention were made with government support under contract DE-FC26-05NT42644 awarded by the U.S. Department of Energy. The government may have certain rights in the invention.

BACKGROUND OF THE INVENTION

1. Field of the Invention

The invention relates to active, non-intrusive measurement of the mass flow rate of a gas flow, such as in gas turbine engines. Mass flow rate is commonly used as an indicator of performance of gas turbine engines. Such engines include, by way of example, industrial gas turbine (IGT) engines, other types of stationary gas turbine, marine, aero and other vehicular gas turbine engines. More particularly, embodiments of mass flow rate measurement methods and apparatus disclosed herein utilize non-intrusive acoustic transceivers for velocity and temperature determinations along lines of sound within the gas flow. In embodiments disclosed herein, the temperature and velocity determinations are used in computing an overall mass flow rate for the engine. The computed mass flow rate is used for gas turbine engine monitoring, control and performance evaluation.

2. Description of the Prior Art

Combustion turbines, such as gas turbine engines for any end use application, generally comprise a compressor section, a combustor section, a turbine section and an exhaust section. In operation, the compressor section inducts and compresses ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

Combustion anomalies, such as flame flashback, have been known to occur in combustion sections of gas turbine engines. Flame flashback is a localized phenomenon that may be caused when a turbulent burning velocity of the air and fuel mixture exceeds an axial flow velocity in the combustor assembly, thus causing a flame to anchor onto one or more components in/around the combustor assembly, such as a liner disposed around the combustion chamber. The anchored flame may burn through the components if a flashback condition remains for extended periods of time without correction thereof. Thus, flame flashback and/or other combustion anomalies may cause undesirable damage and possibly even destruction of combustion engine components, such that repair or replacement of such components may become necessary.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter that may be used to monitor the operating condition of the engine. For example, a controller may monitor a measured turbine exhaust temperature, and a measured change in temperature at the exhaust may result in the controller changing an operating condition of the engine. In other known types of control arrangements discrete pitot-static or multi hole pressure probes are utilized to determine gas flow velocity at specific locations, but grid arrays of such probes disrupt gas flow and introduce measurement errors. Due to such gas flow disruptions, grid arrays, when employed, have limited numbers of widely spaced probes, which provide relatively coarse gas flow velocity distribution and profile information.

At present, there are several different types of sensors and sensing systems that are being used in the industry for monitoring combustion and maintaining stability of the combustion process for engine protection. For example, dynamic pressure sensors are being used for combustion stability and resonance control. Passive visual (optical visible light and/or infrared spectrum) sensors, ion sensors and Geiger Mueller detectors are used to detect flame on/off in the combustor, while thermocouples are being used for flashback detection. With respect to known combustion gas flow velocity (u) monitoring methods, pitot-static and multi hole pressure probes utilize differential pressure techniques, hot wire probes utilize thermal anemometry techniques, while Laser Doppler and Particle Image Velocimetry systems utilize optical techniques to characterize gas flow velocities. Differential pressure and thermal anemometry instruments are intrusive point measurement devices that disturb local gas flow around the instruments. Laser Doppler and Particle Image Velocimetry instruments respectively provide non-intrusive point and 2- or 3-dimensional non-intrusive gas flow velocity measurement although they both require particle seeding of the flow. In addition, sophisticated laser based measurements such as Filtered Rayleigh Scattering (FRS) and other such laser spectroscopy based techniques have been deployed to measure gas velocity. However, these techniques are more complex than intrusive differential pressure or thermal anemometry instruments and require more specialized training to implement in monitoring systems. Moreover, most optical techniques for velocity are geared towards laboratory environments rather than in operative engines at power plant field sites. With respect to temperature (T) monitoring techniques, known Raman Spectroscopy, Laser Induced Fluorescence (for both u and T monitoring), and Coherent Anti-Stokes Raman Spectroscopy (CARS) (for both u and T monitoring) instrumentation systems are also intended for laboratory environments, rather than for field use in fossil power generation equipment. Tunable Diode Laser Absorption Spectroscopy (TDLAS) instrumentation is used in some industrial power generation field applications, such as for temperature measurement in boilers but that instrumentation is extremely costly: approximately US $500,000 per system. Other types of temperature measurement and combustion anomaly detection systems have had greater acceptance in power generation industry field applications.

Particularly, U.S. Pat. No. 7,853,433 detects and classifies combustion anomalies by sampling and subsequent wavelet analysis of combustor thermoacoustic oscillations representative of combustion conditions with sensors, such as dynamic pressure sensors, accelerometers, high temperature microphones, optical sensors and/or ionic sensors. United States Publication No. US2012/0150413 utilizes acoustic pyrometry in an IGT exhaust system to determine upstream bulk temperature within one or more of the engine's combustors. Acoustic signals are transmitted from acoustic transmitters and are received by a plurality of acoustic receivers. Each acoustic signal defines a distinct line-of-sound path between a corresponding transmitter and receiver pair. Transmitted signal time-of-flight is determined and processed to determine a path temperature. Multiple path temperatures can be combined and processed to determine bulk temperature at the measurement site. The determined path or bulk temperature or both can be utilized to correlate upstream temperature in the combustor. Co-pending U.S. utility patent application No. Ser. No. 13/804,132 calculates bulk temperature within a combustor, using a so-called dominant mode approach, by identifying an acoustic frequency at a first location in the engine upstream from the turbine (such as in the combustor) and using the frequency for determining a first bulk temperature value that is directly proportional to the acoustic frequency and a calculated constant value. A calibration second temperature of the working gas is determined in a second location in the engine, such as the engine exhaust. A back calculation is performed with the calibration second temperature to determine a temperature value for the working gas at the first location. The first temperature value is compared to the back calculated temperature value to change the calculated constant value to a recalculated constant value. Subsequent first temperature values at the combustor may be determined based on the recalculated constant value.

Accurate performance evaluation of gas turbine engines designed for power generation is a major challenge faced by both OEMs and end users. OEMs use performance data primarily to validate new engine designs, while end users need performance data to determine their produced power. Mass flow rate through a gas turbine engine is an important element of performance measurement.

Currently, a combination of intrusive probes and pressure taps provide approximate temperature and velocity information that is used to estimate the performance characteristics of a gas turbine engine. The estimates rely on broad assumptions regarding temperature and flow profiles across the gas flow field. Such velocity and flow information have a high level of uncertainty due to non-uniformities of the gas flow field that are not properly captured in the probe and pressure tap measurements. In addition, measurements suffer from inaccuracies due to the intrusive nature of the techniques used, in which the measured flow is disrupted.

In laboratory environment, under tightly controlled boundary conditions paired with clean room conditions, various optical methods are being successfully used to measure flow and temperature non-intrusively. This is primarily the case for wind tunnels and test-rigs or tests under simulated environments. Under realistic engine conditions at a test engine or at a plant, however, these techniques are unusable at their current state of maturity. Even if utilized, they do not provide sufficiently accurate flow measurement data for use in performance measurement.

Thus, a need exists in the art for an accurate mass flow rate monitoring system that maps actual gas density and gas velocity measurements within a measurement volume of the flow path to account for dynamic flow field variations.

An additional need exists for an active mass flow rate monitoring system in which temperature and velocity measurements are made non-intrusively, thus not disturbing the measured flow field.

An additional need exists for an active mass flow rate monitoring system that shares sensors commonly used with turbine monitoring and control systems, so that active mass flow rate monitoring can be integrated within the monitoring and control system.

Another need exists for an accurate mass flow rate monitoring system that computes a mass flow value over time to compensate for an unsteady flow profile as well as short term inaccuracies and variability in the monitoring system.

An additional need exists for an integrated gas turbine engine monitoring and control system for measuring mass flow rate and other parameters, and for providing performance information to a turbine controller in a feedback loop, sharing common sensors and, if desired, a common controller.

SUMMARY OF THE INVENTION

An object of embodiments of the invention is the active, non-intrusive monitoring of mass flow rate within a gas turbine engine.

Another object of embodiments of the invention is the processing of time-of-flight data gathered from non-intrusive acoustic transmitters and sensors to yield mass flow information within a gas turbine engine.

Another object of embodiments of the invention is providing a system for actively monitoring a mass flow rate of a gas through a gas turbine engine using acoustic data generated by acoustic transmitters and receivers measuring times-of-flight in the flow path.

Another object of embodiments of the invention is creation of an integrated gas turbine monitoring and control system for measuring mass flow rate and other parameters, and for providing performance information to a turbine controller in a feedback loop, sharing common sensors and, if desired, a common controller.

Another object of embodiments of the invention is the active measurement of mass flow rate within a gas turbine combustor without disturbing or distorting the measured gas field.

These and other objects are achieved in one or more embodiments of the invention by active acoustic measurement systems and methods described herein. Embodiments of the mass flow monitoring systems and methods are used for non-intrusive monitoring of gas within gas turbine engines, including within an exhaust component of an industrial gas turbine (IGT). The mass flow monitoring systems and methods may incorporated into the turbine monitoring and control system. Acoustic transmitters transmits sound waves within a turbine flow field in a line-of-sound with acoustic receivers. For velocity measurement, sound transmission time-of-flight that is directed generally oblique to the gas flow path is measured by the controller and correlated with gas flow velocity along the line-of-sight. Similarly, sound transmission time-of-flight is correlated with temperature along lines-of-sight generally transverse to the flow path. Path(s) of acoustic transmission serve as paths for velocity or velocity/absolute temperature measurement. Maps of volumetric flow rate and gas density are then computed from the velocity and temperature information, the flow path geometry and static pressure measurements. The gas mass flow rate is computed based on the gas density and volumetric flow rate maps.

In some embodiments, a method is provided for actively monitoring a mass flow rate of gas through a gas turbine engine. Output signals generated by a plurality of acoustic sensors are received. The output signals are indicative of thermoacoustic oscillations having contributions from acoustic signals from at least one acoustic transmitter in a gas flow path of the gas turbine engine. The plurality of acoustic sensors and the at least one acoustic transmitter define line-of-sound paths relative to each other in the gas flow path. A time-of-flight for the acoustic signals traveling along each of the line-of-sound paths is determined. The times-of-flight for the acoustic signals traveling along each of the line-of-sound paths are processed to determine speeds of sound and gas flow velocity vectors along each of the line-of-sound paths. A volumetric flow rate is computed based on the of gas flow velocity vectors in the gas flow path and further based on a flow path geometry. A gas density is computed based on the speeds of sound along each of the line-of-sound paths and further based on a measured static pressure in the gas flow path. The gas mass flow rate is computed based on the of gas density and the volumetric flow rate.

In further embodiments, the computing of the gas mass flow rate is described by the equation:

$$\dot{m} = \rho \cdot \dot{V}$$

where $\dot{m}$ is the mass flow rate, $\rho$ is the gas density and $\dot{V}$ is the volumetric flow rate.

In another embodiment, the computing of the gas density is described by the equation:

$$\rho = \frac{mP}{nRT}$$

where $\rho$ is the gas density, m is mass of the gas, P is the measured static pressure in the gas flow path, n is a number of gas molecules, R is a universal gas constant and T is a mapping of a temperature of the gas.

In optional embodiments, the determining of the time-of-flight is described by the equation:

$$t_{BC} = \int_B^C \frac{1}{c(x,y,z) + \vec{p}_{BC} \cdot \vec{u}(x,y,z)} ds$$

where $t_{BC}$ is the time of flight from a transmitter B to a sensor C; c is a speed of sound in the gas flow for a temperature and gas constant; $\vec{p}_{BC}$ is a unit vector along a line of sound path; and $\vec{u}(x,y,z)$ is a velocity vector in the gas flow. The determining of the time-of-flight may be an integration over an increased time interval to account for an unsteady gas flow.

In other embodiments, computing a volumetric flow rate comprises computing an average volumetric flow rate for the gas flow path, or alternatively, computing a volumetric flow rate mapping including volumetric flow rate values for a plurality of locations within the gas flow path. Similarly, computing a gas density may comprise computing an average gas density for the gas flow path or, alternatively, may comprise computing a gas density mapping including gas density values for a plurality of locations within the gas flow path.

In other embodiments, transmitting acoustic signals from the at least one acoustic transmitter in a gas flow path of the gas turbine engine comprises transmitting the acoustic signals from a transmitter oriented at an angle of between 25 and 45 degrees to a first transverse plane through the flow path; and receiving output signals generated by a plurality of acoustic sensors comprises receiving the output signals generated by a plurality of acoustic sensors oriented at an angle of between 25 and 45 degrees to second a transverse plane through the flow path offset from the first transverse plane. The at least one acoustic transmitter and the plurality of acoustic sensors may each be oriented at a same angle to a transverse plane through the flow path.

In other embodiments, transmitting acoustic signals from at least one acoustic transmitter further comprises transmitting acoustic signals from at least one acoustic transceiver, each of the at least one acoustic transceivers comprising an acoustic transmitter and an acoustic sensor; and receiving output signals generated by a plurality of acoustic sensors further comprises receiving output signals from a plurality of acoustic transceivers, each one of plurality of acoustic transceivers comprising an acoustic transmitter and an acoustic sensor. In that case, the method may further include receiving the measured static pressure in the gas flow path from static pressure sensors located on the acoustic transceivers.

In further embodiments, receiving output signals generated by a plurality of acoustic sensors comprises receiving output signals generated by at least 8 acoustic sensors. In another embodiment, the plurality of acoustic sensors are acoustic sensors selected from a group consisting of capacitive sensors, piezoresistive sensors and fiber optic-based sensors. In another embodiment, the at least one acoustic transmitter is an acoustic transmitter selected from a group consisting of an electrodynamic speaker, a piezoelectric acoustic transmitter, a mechanical gas-flow-activated acoustic transmitter and a spark gap acoustic transmitter.

In other embodiments, a system is provided for actively monitoring a mass flow rate of gas through a gas turbine engine. The system includes at least one acoustic transmitter mounted to the gas turbine engine for transmitting acoustic signals in a gas flow path of the gas turbine engine; and a plurality of acoustic sensors mounted to the gas turbine engine for receiving thermoacoustic oscillations having contributions from the acoustic signals in the gas flow path, the plurality of acoustic sensors being further for generating output signals indicative of the thermoacoustic oscillations, the plurality of acoustic sensors and the at least one acoustic transmitter defining line-of-sound paths relative to each other in the gas flow path of the gas turbine engine. A processor is connected to the plurality of acoustic sensors for receiving the output signals. The system further includes computer readable media containing computer readable instructions that, when executed by the processor, cause the processor to perform the following operations: determining a time-of-flight for the acoustic signals traveling along each of the line-of-sound paths; processing the times-of-flight for the acoustic signals traveling along each of the line-of-sound paths to determine speeds of sound and gas flow velocity vectors along each of the line-of-sound paths; computing a volumetric flow rate based on the of gas flow velocity vectors in the gas flow path and further based on a flow path geometry; computing a gas density based on the speeds of sound along each of the line-of-sound paths and further based on a measured static pressure in the gas flow path; and computing a gas mass flow rate based on the of gas density and the volumetric flow rate.

In further embodiments, computing a volumetric flow rate comprises computing a volumetric flow rate mapping including volumetric flow rate values for a plurality of locations within the gas flow path. In additional embodiments, computing a gas density comprises computing a gas density mapping including gas density values for a plurality of locations within the gas flow path.

In additional embodiments, a non-transitory computer-readable medium is provided, having computer readable instructions stored thereon for execution by a processor to perform operations as described above.

The respective objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
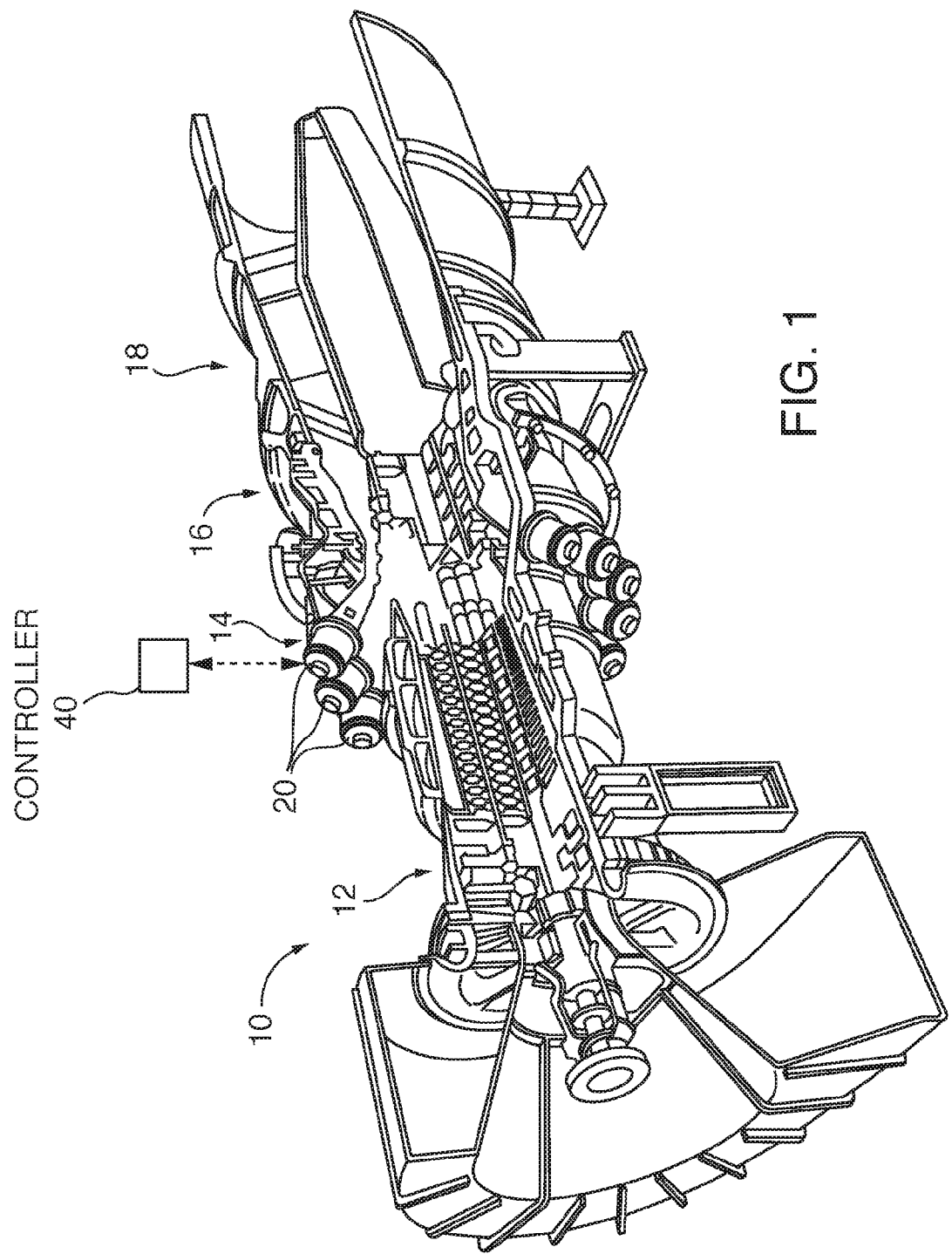
FIG. 1 is a perspective cross-sectional view of a gas turbine engine illustrating implementation of a system for determining combustor gas flow active velocity and temperature measurement, in accordance with embodiments of the invention.

After considering the following description, those skilled in the art will clearly realize that the teachings of the invention can be readily utilized for active acoustic velocity and pyrometry-based gas flow velocity and temperature measurement. Embodiments of the invention are used for monitoring of gas turbine combustors, including industrial gas turbine (IGT) combustors by incorporating them into the combustion monitoring and control system by addition of an acoustic transmitter or acoustic transceiver that transmits sound waves through gas flow in a line-of-sight with a plurality of acoustic sensors, such as dynamic pressure sensors. For velocity measurement, sound transmission time-of-flight that is directed generally transversely through the gas flow path is measured by the controller and correlated with gas flow velocity along the line-of-sight. The gas flow velocity determination includes compensation for impact of the thermodynamically interrelated temperature, gas constant and speed of sound influences on the first time-of-flight, in order to determine absolute gas flow velocity.

In an integrated acoustic pressure-based sensor and monitoring/control system embodiment, the controller correlates velocity and, if desired, absolute active path temperatures simultaneously with acoustic transmission and time-of-flight analysis techniques. Where velocity and temperature are measured simultaneously the absolute active path temperature is utilized to compensate for the aforementioned thermodynamic influences on gas flow absolute velocity. Alternatively in other embodiments the speed of sound influence on the first time-of-flight is utilized to determine absolute gas flow velocity rather than absolute active path temperature. In such embodiments, compensation for the speed of sound in the velocity monitoring is accomplished by substituting for the first transmitters a set of first transceiver/transducers that are capable of transmitting and receiving acoustic signals, and generating output signals and substituting for the first sensors a set of second transducers that are capable of transmitting and receiving acoustic signals and generating output signals. Acoustic signals are transmitted and received from the first to the second transducers and time-of-flight determined. A reverse acoustic signal is transmitted from the second to the first transducers and the reverse time-of-flight is determined. The respective first and first reversed acoustic signals times-of-flight are used to determine the speed of sound c. The determined speed of sound c is then utilized for determination of the actual gas flow velocity.

In embodiments of the invention active velocity or active velocity/temperature measurements are used as monitoring parameters for gas flow in a combustion monitoring and control system that can identify and classify gas flow anomalies (e.g., combustion anomalies), for example by using wavelet or Fourier analysis techniques. Some embodiments of the methods and system incorporate one or more acoustic dynamic pressure transceiver/transducer combination transmitter/sensors that are selectively oriented or arrayed in sequential axial planar positions within the combustor. Known transceiver/transducer component designs and their related controller components have been used reliably and cost effectively in the past in power generation field service. By reconfiguring those types of known components into the gas flow control and monitoring systems of the present invention combustion turbine and other combustion power generation equipment can be monitored and controlled with simpler instrumentation hardware configurations that provide detailed active gas flow velocity and temperature distribution information useful for precise combustion control.

Monitoring and Control System Structure

Figure 2:
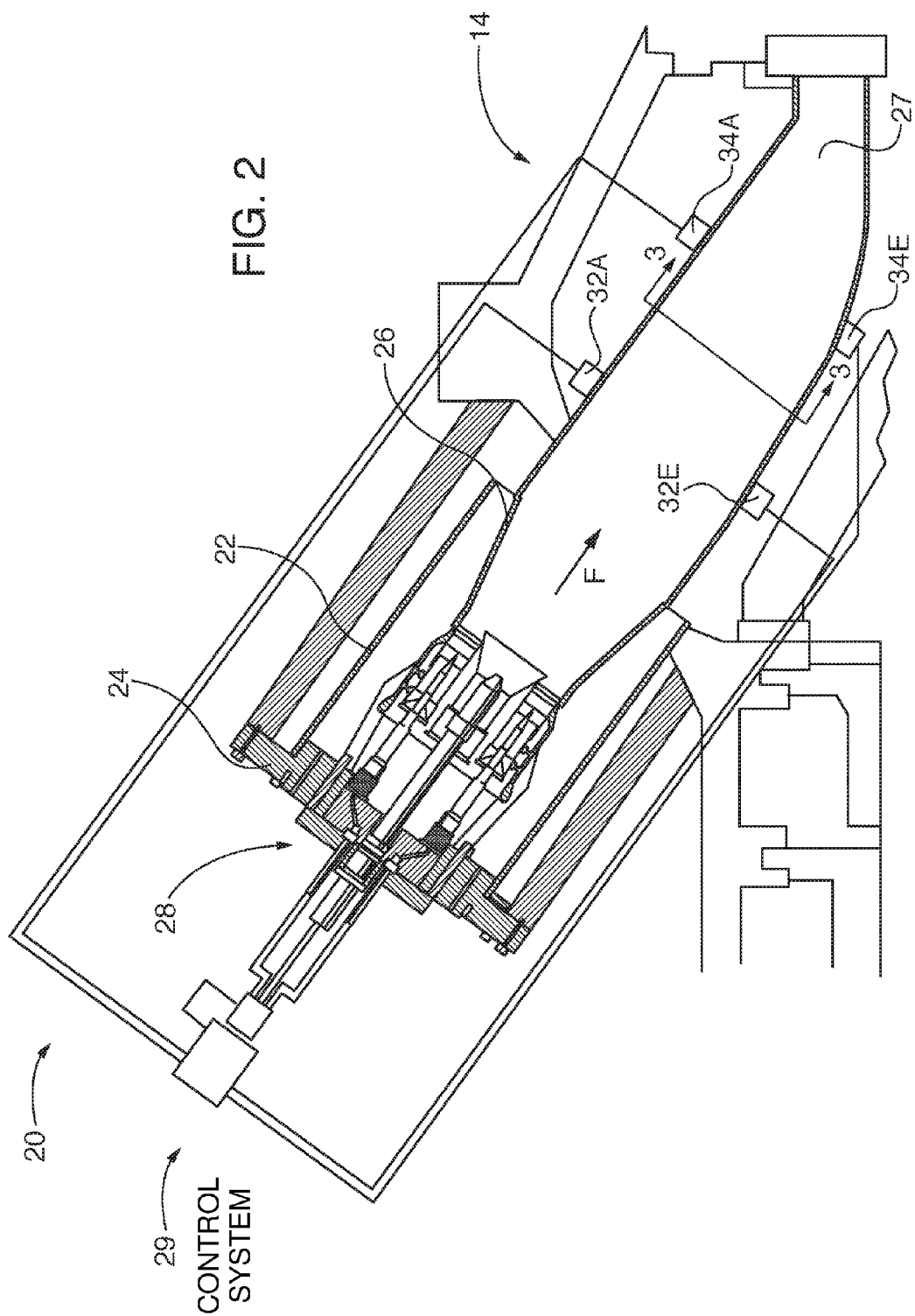
FIG. 2 is a cross-sectional view of a gas turbine combustor incorporating an embodiment of a monitoring system for determining combustor gas flow active velocity and temperature measurement, in accordance with embodiments of the invention.

Referring to FIGS. 1 and 2 an exemplary industrial gas turbine engine 10 is shown. The exemplary engine 10 includes a compressor section 12, a combustor section 14, a turbine section 16, and an exhaust section or system 18. The combustor section 14 includes a plurality of combustors 20. Each combustor 20 has a combustion shell 22 and a cover plate 24. The combustor liner or basket 26 and transition duct 27 define a passage for conveying hot working gas that flows in the direction F to the turbine section 16. The system of the present invention is operable with known combustor geometry gas turbine engine designs, including can, can-annular or annular construction combustors in stationary land-based or vehicular applications.

During operation of the engine 10, compressed air from the compressor section 12 is provided to the combustor section 14 where it is combined with fuel supplied by fuel injection system 28 in the combustors 14. The fuel/air mixture is ignited to form combustion products comprising the hot working gas. It may be understood that combustion of the fuel and air may occur at various axial locations along the passage through the combustor liner or basket 26 and the transition duct 27 to the inlet of the turbine section 16. The hot working gas is expanded through the turbine section 16 and is exhausted through the exhaust section/system 18.

Referring to FIGS. 1 and 2, in accordance with an aspect of the invention, a combustion monitoring and control system 29 is provided, which can identify and classify combustion anomalies and actively control the gas turbine combustion process within one or more of the engine 10 combustors 20. In this regard, the engine 10 may include may comprise one or more of the monitoring and control system(s) 29: e.g., one system 29 for each combustor 20, or a single system 29 may service each combustor 14 of the engine 10. Similarly, clusters of combustors 20 may be served by one system 29, with other cluster(s) being served by other systems. Thus the consolidated monitoring system for an engine 10 can determine deviations between respective combustors and compare their relative performance no matter what engine combustor structure or orientation is employed by the engine design: whether a stationary, land-based turbine engine or a vehicular engine for aero, marine or land vehicular applications.

Figure 5:
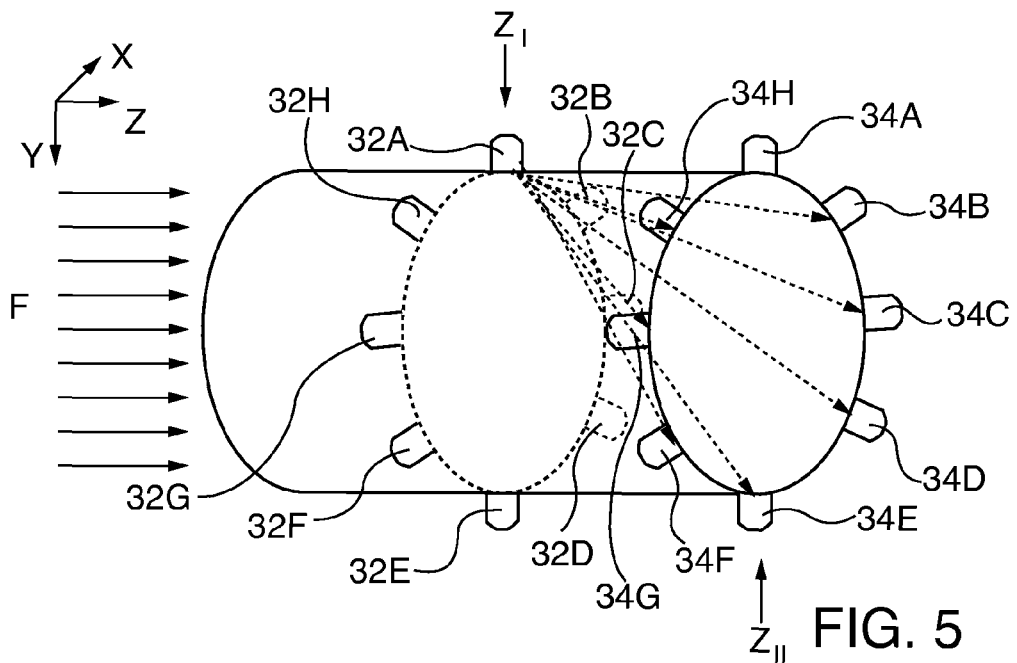
FIG. 5 is a schematic perspective view of exemplary sonic sensor arrays used by the gas flow monitoring system to measure gas flow velocity in a gas turbine combustor, in accordance with embodiments of the invention.
Figure 9:
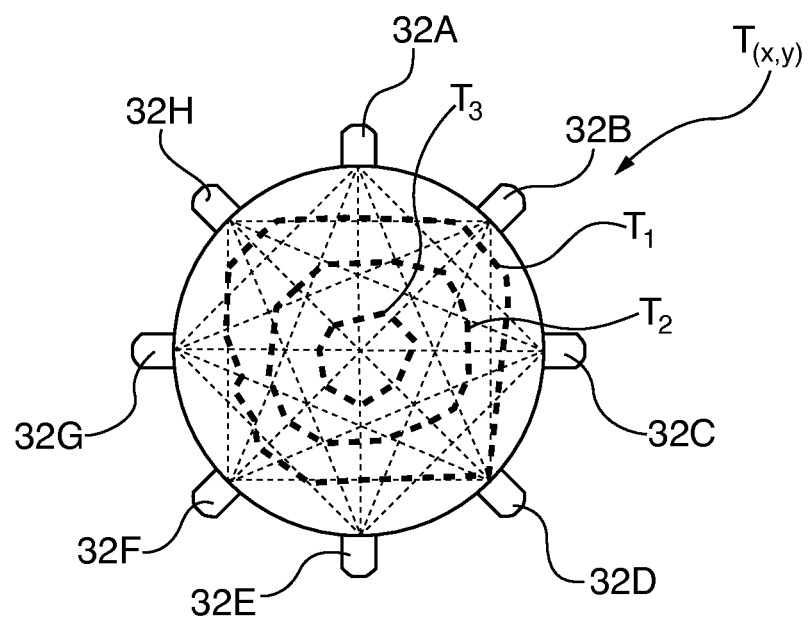
FIG. 9 is a schematic perspective view of exemplary sonic sensor arrays used to measure gas flow temperature in a gas turbine combustor, in accordance with embodiments of the invention.

As shown in FIGS. 2, 3, 5 and 9 the system 29 includes an array of a plurality of known acoustic transceiver/transducers 32A-H and 34A-H that are capable of transmitting and receiving acoustic oscillation waves along exemplary the line-of-sight paths shown in dashed lines in FIGS. 5 and 9. The transceiver/transducer arrays 32, 34 are capable of generating respective sensor output signals indicative of combustion thermoacoustic oscillations in each respective monitored and controlled combustor 20. Other system embodiments can be constructed with at least two, but preferably more acoustic sensors, whether functionally part of a transceiver component or as a stand-alone component. Acoustic frequencies and amplitudes sensed by those acoustic sensor portions of the transceivers are generated as a result of combustion events in the working combustion gas, defining acoustic sources that occur within the combustor 20 hot gas path. The monitoring and control system 29 is configured to transform the sensed thermoacoustic oscillation information into a form that enables the occurrence of combustion anomalies of interest to be discerned. As such, flame flashback events and other types of combustion anomalies of interest may be detected and extracted from sensed thermoacoustic oscillations in the combustor 14 that are monitored by the transceiver/transducer/sensors positioned in and/or around the combustor 14. Depending upon the system 29 configurations and application, the acoustic sensors comprise any combination of one or more of a dynamic pressure sensor, a microphone, an optical sensor or an ionic turbine inlet sensor. Pressure sensors sense the amplitudes of thermoacoustic oscillations in the combustor 20 as well as pulsation frequencies. A high temperature microphone may be utilized to measure acoustic fluctuations in the combustor 14. An optical sensor may be utilized to measure a dynamic optical signal within the combustor 20. An ionic sensor may be utilized to measure dynamic ionic activity within the combustor 20.

Figure 3:
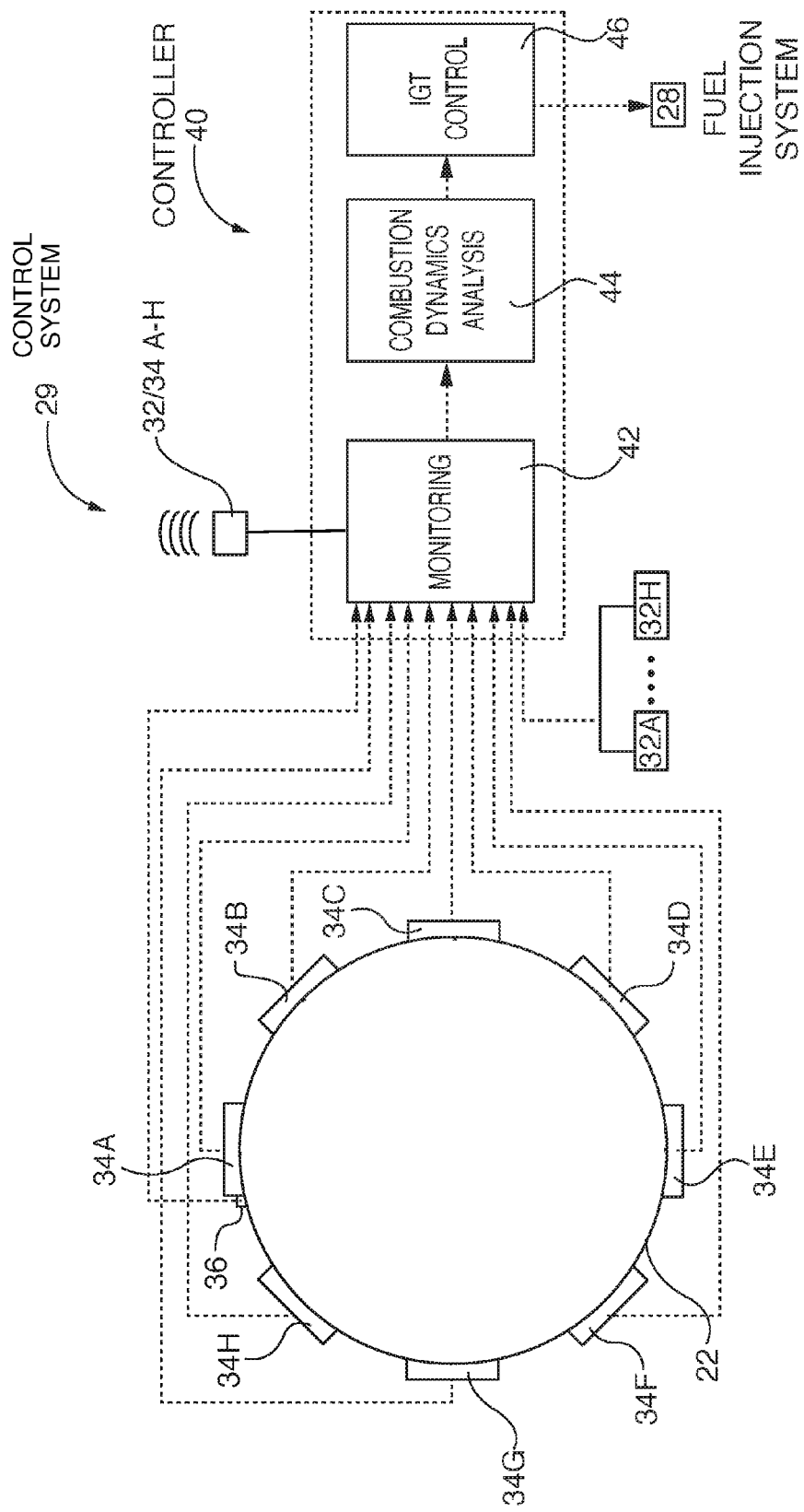
FIG. 3 is a cross-sectional view of the system of FIG. 2, taken along 3-3 thereof, in accordance with aspects of the invention.

An exemplary acoustic sensor array shown schematically in FIGS. 2, 3, 5 and 9 comprises transceiver/transducers 32A-H and 34A-H that function as at least one acoustic transmitter that transmits in turn to at least one and preferably a plurality of the dynamic pressure sensors in the array. The transceiver/transducers 32, 34 are arrayed axially and radially within the combustor 20 by known mounting structures and methods, such as J tubes or rakes, within the combustor shell 22 proximal the combustor basket or liner 26, and/or proximal the transition 27 junction with the turbine section 16. In FIG. 3 the sensors are radially/circumferentially arrayed transceivers 34A-34H that are capable of transmitting and receiving acoustic oscillation waves along the line-of-sight paths similar to the transceivers 32A-H shown in dashed lines in FIG. 9. Other types of known sensors, such as individual thermocouple temperature sensors or thermocouple arrays may be employed within the gas turbine engine. For example in FIG. 3 thermocouple 36 measures combustion temperature in the combustor 20. While exemplary three-dimensional annular combustion flow paths and axially spaced, two-dimensional circular-annular transceiver/transducer arrays are shown in the figures, other combustion flow path and array orientations may be utilized, in practicing embodiments of the invention, including square- or rectangular-shaped geometries.

Figure 4:
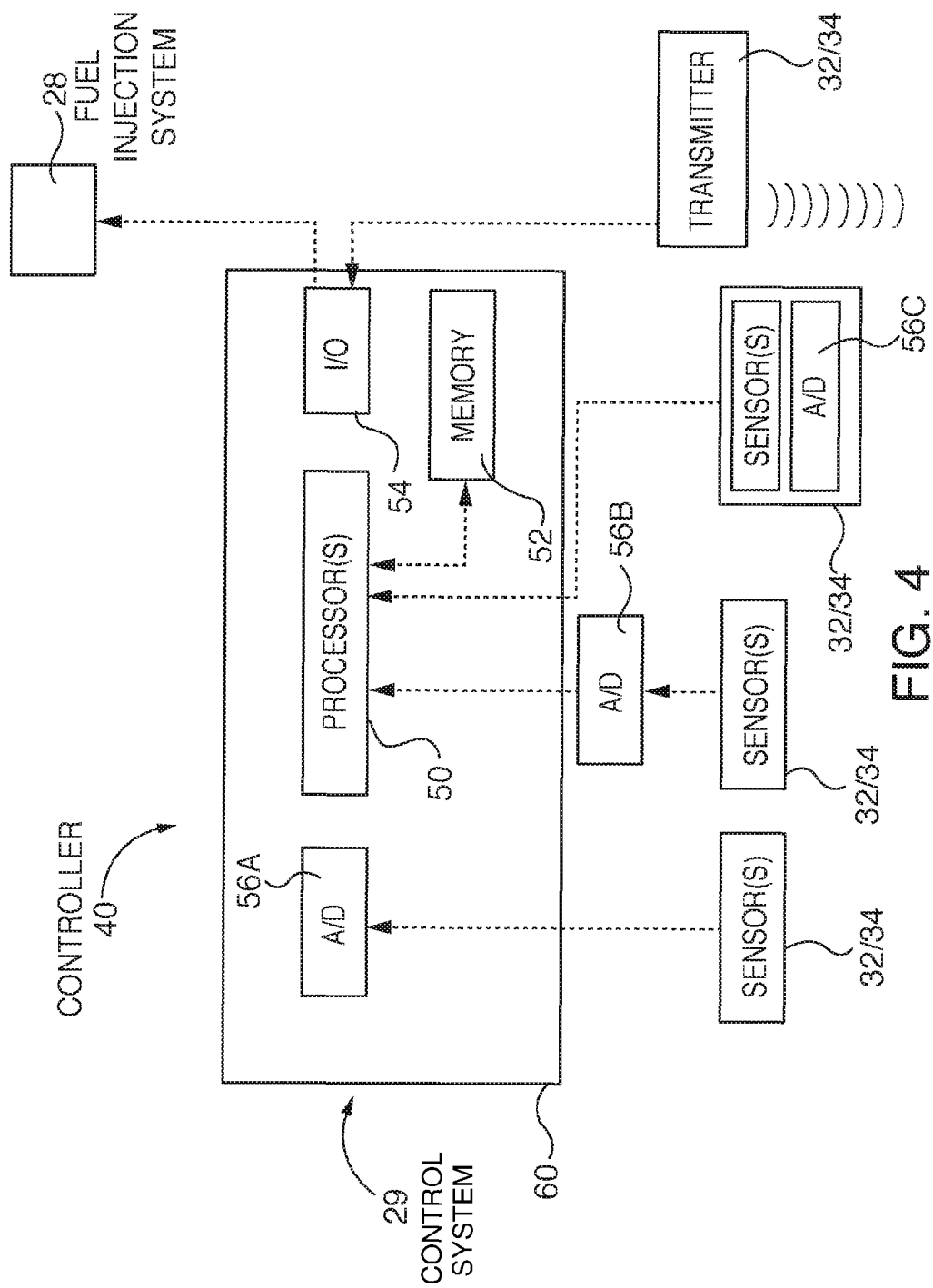
FIG. 4 is a block diagram of an embodiment of a controller for implementing embodiments of the present invention in the monitoring system for determining combustor gas flow active velocity and temperature measurement, in accordance with embodiments of the invention.

As shown in greater detail in FIGS. 3 and 4, the monitoring and control system 29 comprises a known controller 40, coupled to the transceiver/transducers 32, 34, that is capable of correlating sensor output signals with gas flow velocity and combustion temperature in a monitoring section 42 and conducting combustion dynamics analysis of the combustion process in an analysis section 44. The monitoring section 42 and dynamic analysis 44 section outputs are utilized by the gas turbine control system 46 that can send control signals to other gas turbine controls subsystems, including industrial gas turbine (IGT) controls subsystems, such as the fuel injection system 28, in order to unload or shut down the engine 10 in response to changes in monitored combustion conditions within the combustor 20.

Referring to the exemplary controller 40 embodiment shown in FIG. 4, it includes one or more processors 50, system memory 52 and input/output control devices 54 for interfacing with the associated engine 10 controls, such as the fuel injection control system 28, and the acoustic transceiver/transducer 32, 34 acoustic transmitters and sensors 32 (or functionally equivalent performing separate discrete transmitters and receiver sensors), networks, other computing devices, human machine interfaces for operator/users, etc. The controller 40 may also include one or more analog to digital converters 56A and/or other components necessary to allow the controller 40 to interface with the transceivers 32, 34 and/or other system components to receive analog sensor information. Alternatively, and/or additionally, the system 29 may include one or more analog to digital converters 56B that interface between the transceivers 32, 34 (or functionally equivalent performing separate discrete transmitters and receiver sensors) and the controller 40. As yet a further example, certain transceivers 32, 34 may have an analog to digital converter 56C integral therewith, or are otherwise able to communicate digital representations of sensed information directly to the controller 40.

The processor(s) 50 may include one or more processing devices such as a general purpose computer, microcomputer or microcontroller. The processors 50 may also comprise one or more processing devices such as a central processing unit, dedicated digital signal processor (DSP), programmable and/or reprogrammable technology and/or specialized component, such as application specific integrated circuit (ASIC), programmable gate array (e.g., PGA, FPGA).

The memory 52 may include areas for storing computer program code executable by the processor(s) 50, and areas for storing data utilized for processing, e.g., memory areas for computing wavelet transforms, Fourier transforms or other executed mathematical operations used to operate the monitoring and control system 29, as described more fully herein below. As such, various aspects of the present invention may be implemented as a computer program product having code configured to perform the detection of combustion engine anomalies of interest, combustion dynamics and engine control functions as set out in greater detail herein.

In this regard, the processor(s) 50 and/or memory 52 are programmed with sufficient code, variables, configuration files, etc., to enable the controller 40 to perform its designated monitoring and control functions. For example, the controller 40 may be operatively configured to sense thermoacoustic conditions, analyze thermoacoustic conditions based upon inputs from one or more transceiver/transducers 32, 34, control features of the engine 10 in response to its analysis, and/or report results of its analysis to operators, users, other computer processes, etc. as set out in greater detail herein. Thus, all of the dynamic output signals originating from transceiver/transducers 32, 34 may be communicated to a single processor 50. In this implementation, the single processor 50 will process the sensor dynamic output signals using the data analysis and control functions described in greater detail herein, such that it appears as if the results are computed in a generally parallel fashion. Alternatively, more processors 50 can be used and each processor may be utilized to process one or more transceiver/transducers 32, 34 dynamic signals, e.g., depending for example, upon the computation power of each processor.

Monitoring and Control System Operation

Figure 10:
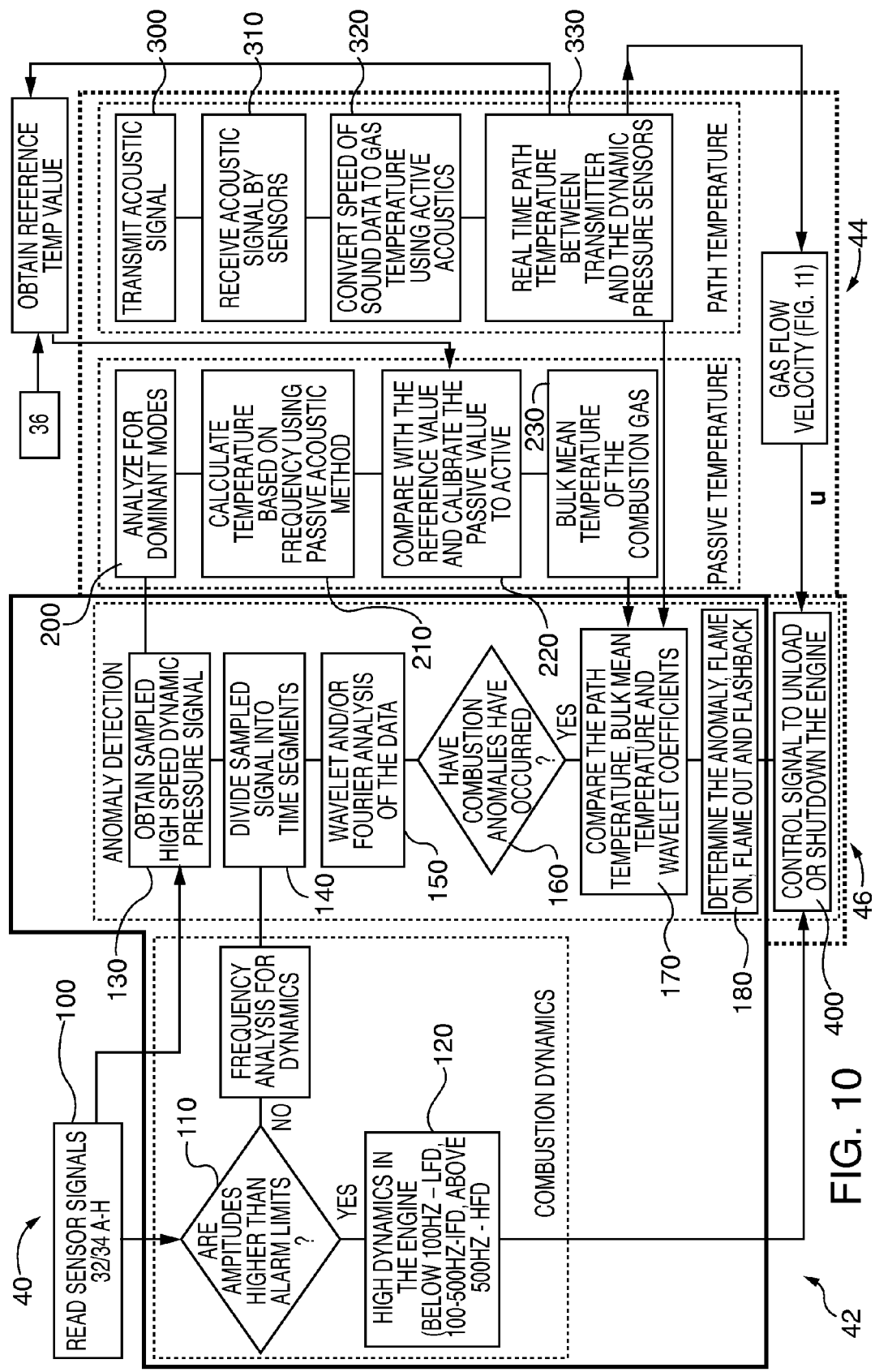
FIG. 10 is a flow chart illustrating implementation of an embodiment of the methods for measuring gas flow velocity and temperature active measurement in a gas turbine combustor, in accordance with embodiments of the invention.
Figure 11:
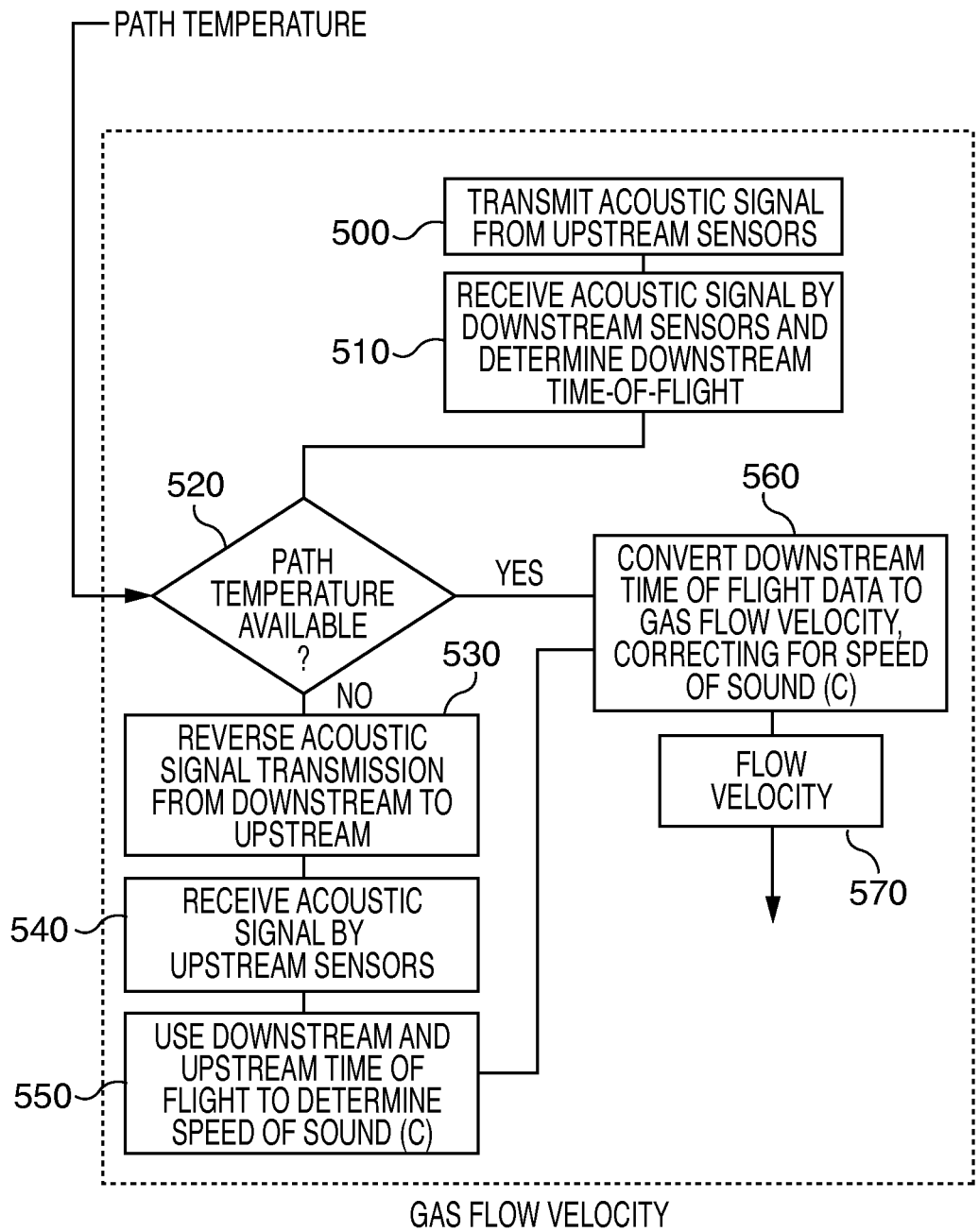
FIG. 11 is a flow chart illustrating implementation of an embodiment of the method for measuring active gas flow velocity, in accordance with embodiments of the invention.

The concepts of acoustic temperature and velocity measurements are both based on creating a sonic wave, listening to it across the gas stream and finding an average speed of sound across a given path, which is then descriptive for the gas velocity or velocity/temperature. FIGS. 10 and 11 are flow charts illustrating graphically exemplary operation of a monitoring and control system 29 embodiment of the invention that actively monitors and measures both gas flow velocity and temperature using acoustic measurement methodologies. The thick solid and dotted line operational blocks relate to previously described combustion dynamics analysis 42 (solid block), temperature monitoring and determination 44 and gas turbine control 46 functions (including by way of example IGT control functions) that are performed within the controller 40. In step 100 sensor signals generated by the sensor components within the transceiver/transducers 32A-H, 34 A-H are read. In step 110 amplitudes of one or more of the sensor signals are compared to previously established alarm limits. For example in IGT applications the step 120 low frequency dynamics (LFD) below 100 Hz are of importance because of potential resonance influence at the 50 Hz or 60 Hz engine rotational speed. Other frequency bands of interest are intermediate frequency dynamics (IFD) between approximately 100-500 Hz and high frequency dynamics (HFD) above 500 Hz. If an alarm limit is exceeded the controller 40 sends a control command, for example to the fuel injection system 28, to unload or shut down the engine 10 in step 400.

If an alarm limit is not exceeded in step 110, then frequency analysis for dynamics is performed in anomaly detection portion of the combustion dynamics analysis sub system. An exemplary description of how to perform anomaly detection is in U.S. Pat. No. 7,853,433 that is incorporated herein by reference. The sampled high speed dynamic pressure signal is obtained from the sensors in step 130 and time divided into segments in step 140. In step 150 the time-frequency divided sample segments are analyzed using the wavelet analysis technique described in U.S. Pat. No. 7,853,433. Alternatively, a known Fourier spectral analysis that converts the time segments into frequency space, analyzes dominant frequencies by identifying the peak frequencies and their respective amplitudes, and identifies amplitudes exceeding defined thresholds. If it is determined that a combustion anomaly or anomalies have occurred in step 160 the combustor temperature as determined in the temperature monitoring and determination subsystem 44 is compared with the anomaly information obtained by the Fourier or wavelet analysis techniques, or both. In step 180 the anomaly classification as a flame on, flame out or flashback is made in conjunction with the passive or path temperature information obtained from the temperature monitoring and determination subsystem 44. For example in a gas turbine flameout the combustor temperature drops off dramatically. Conversely in a flashback scenario the combustor temperature rises dramatically upstream within the combustor 14. When the anomaly determination is made in step 180 appropriate control signals to unload or shut down the engine are made in the engine control system 46.

The temperature monitoring and determination subsystem 44 may comprise passive temperature determination utilizing the passive acoustic method described in U.S. Patent Application "Temperature Measurement in a Gas Turbine Engine Combustor, filed on Mar. 14, 2013, Ser. No. 13/804,132, incorporated by reference herein, and/or real time actual path temperature determination within the combustor 14. Real time actual path temperature is determined by adaptation of the 2-D planar acoustic pyrometry technique for gas turbine exhaust system temperature determination described in United States Patent Publication No. US2012/0150413 (also incorporated by reference herein) or by a 3-D technique that determines one or more path temperatures between the sensor arrays 32/34 of FIG. 5, that is further described in greater detail herein.

In the passive temperature determination method, sampled high speed dynamic pressure signals from the transceiver/transducers 32/34, such as obtained in step 130 are analyzed for dominant modes in step 200. Combustor temperature is calculated based on frequency using the passive acoustic method in step 210. The passive value is calibrated with a reference temperature value in step 220 in order to obtain an active temperature value within the combustor 14. The calibrated passive temperature value determined in step 220 is utilized in step 230 to determine the bulk mean temperature of the combustion gas in step 230. The reference temperature value used in step 220 may be obtained from one or more thermocouples 36 in the combustor or thermocouples located in the exhaust system 18 (not shown). The reference temperature value may be an actual path temperature measured in the exhaust system 18, as described in United States Patent Publication No. US2012/0150413 or a real time path temperature measured in the combustor 14 that is determined in steps 300-330.

The 2-D real time path temperature is measured by transmitting one or more acoustic signals in an acoustic transceiver/transducer 32, 34 or other discrete transmitter, such as in the 2-D planar pattern shown for the (n=8+ transceiver/transducers 32A-H in FIG. 9. For example, transceiver/transducer 32A transmits a signal that is received by the remaining (n−1) transceiver/transducers 32B-H and the time-of-flight for each line-of-sight path is determined. However, at least one, preferably two or more sensor elements in the remaining transceiver/transducers 32B-H receive the acoustic signal(s) in step 310. Preferably in practice several transceiver/transducers (transmit and receive acoustic signals) circling one plane such that the paths between all transceivers form a grid with desired coarseness which results in the spatial resolution of the temperature measurement. For example, for a cylindrical combustor the transceivers could be equally spaced around the periphery as shown in FIGS. 3 and 9. These could be either fired sequentially (one at a time) or simultaneously with disjoint sound patterns that can be readily differentiated. For sequential firing one transceiver is creating sounds while all remaining transceivers record it to estimate the travel time for the respective paths. Each of these line-of-sight paths represents an average temperature along that path. The average temperatures over different paths are combined to a two-dimensional map shown in FIG. 9, using a known computer tomography technique.

The 2-D time-of-flight sound data are converted to gas temperature using active acoustics in step 320, such as by utilization of the methods described in the aforementioned United States Patent Publication No. US2012/0150413 that is incorporated by reference herein. The real time path temperature that is determined in step 330 is the localized active temperature value along the line-of-sight transmission path. A plurality of active temperature values measured along different acoustic paths by performing the steps 300-330 can be utilized to determine the combustor 14 bulk temperatures, alone or in parallel with the dominant frequency passive acoustic method of steps 200-230. While a single path active temperature measurement between a single transmitter 30 and acoustic sensor 32 provides useful control information, arraying a plurality of transceiver/transducers 32, 34 selectively in any axial, circumferential and/or radial pattern or combinations thereof within a combustor 14 (see, e.g., FIG. 2, 3, 5, or 9) or in a series of combustors 14 facilitates active real time two- or three-dimensional combustion temperature monitoring within the gas turbine engine 10.

The 2-D or 3-D real time path temperature determined in steps 300-330 can be utilized as an input for other monitoring and control functions, with or without one or more of the combustion dynamics analysis 42, passive temperature monitoring and deter 44 and control 46 functions described in the exemplary integrated monitoring and control system 29 described herein. For example combustor turbine inlet temperature (TIT) can be actively monitored in real time and used as a control parameter for the combustion process. The combustion active path temperature determined in steps 300-330 can be utilized to control the fuel/air mixture in the combustor 14 via the fuel injection system 28. The real time path active temperature can be utilized as an input for active actual gas flow velocity measurement in an industrial gas turbine combustor or in other types of gas flow environments.

Embodiments of the present invention measure 3-D gas flow velocity and/or gas flow temperature by correlation with sonic time-of-flight along a line-of-sight sonic pathway between axially spaced, transversely oriented sonic transmitter and sensor (or transceiver/transducers incorporating the sensors and transmitters), so that the line-of-sight along the pathway is oriented transverse, as opposed to parallel to the gas flow path. In order to determine gas flow absolute velocity, the time-of-flight data are corrected or compensated for thermodynamic influences on gas temperature, gas constant and speed of sound. As noted above gas temperature along a line of sight can be determined using the real time active path temperature or temperature independently obtained from another measurement device (e.g., thermocouple 36). Alternatively localized speed of sound c can be determined by measuring bi-directional time-of-flight (i.e., forward/downstream transmission and reverse/upstream transmission). The aforementioned thermodynamic influences are governed by the known equation:

$$c(x,y,z) = (\gamma \cdot R \cdot T)^{1/2}$$

Where:
c(x,y,z) is the isentropic speed of sound;
γ is specific heat ratio;
R is the gas constant; and
T is the gas temperature.
Therefore, once the speed of sound along a path is known, the average path temperature and absolute velocity can be determined utilizing embodiments of the invention further described herein.

For accurate absolute velocity or temperature measurement, two planes of transceiver/transducers 32, 34 are oriented in axially spaced, opposed relationship within the gas flow, as shown in FIG. 5. The two transceiver/transducer planes 32, 34 are preferably apart by approximately the same order of magnitude as the diameter (circular) or width (square or rectangular) of the monitored gas flow geometry. That is, the axial distance between the two planes should be determined according to the geometry and scale of the interrogated environment as well as the anticipated or possible ranges of gas flow gas constant, temperature and velocity.

Figure 8:
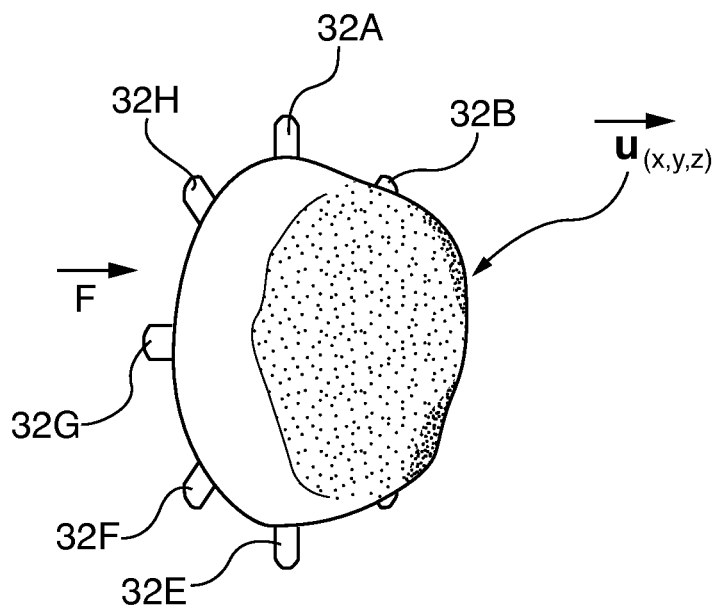
FIG. 8 is a composite gas flow velocity profile of the respective velocities measured by the gas flow velocity monitoring system, in accordance with embodiments of the invention.

For gas flow velocity estimation, the gas flow is measured axially and transverse to the flow direction. For example, when transceiver/transducer 32A in plane $Z_I$ fires or transmits a signal, all transceiver/transducers 34B-H in plane $Z_{II}$ that are not parallel-aligned with the signal firing sensor will be listening, thereby creating several paths across the gas flow (n–1 paths for n sensors). The signal transmitting/receiving firing process continues sequentially with the second transceiver/transducer 32B on plane $Z_I$ firing to the remaining (n–1) transceiver/transducers 34A and 34C-H, which receive that transmitted signal. The transmitted signal firing will continue on with the consecutive transceivers firing and creating n–1 paths for each firing. In the embodiment of FIG. 5, having 8 transceivers/transducers in each of the two axially spaced arrays there are a total of 64 paths in three dimensions. In addition, to alleviate the directional ambiguity of the velocity (to identify reverse flows and perhaps turbulence fluctuations in reverse direction) the same process will be repeated with transducer/transceivers 34 in plane $Z_{II}$ firing and transceiver/transducers in plane $Z_I$ receiving the reverse direction transmitted acoustic signal, assuming that the gas flow temperature is already known. Instead of transmitting/firing acoustic signals sequentially from each transceiver/transducer, a sound pattern with a slightly different acoustic signature can be transmitted from each respective transceiver/transducer 32A-11, 34A-H simultaneously, which shortens measurement time Referring to steps 500 and 510 of the gas flow velocity measurement method flow chart of FIG. 11, once all transceiver/transducers in planes $Z_I$ and $Z_{II}$ have fired and the transmitted acoustic signals have been received by the opposing plane of transversely aligned transceivers/transducers, the process preferably repeats continually in real time while a 3-D velocity map u is constructed from the spatially distributed line-of-sight acoustic paths, using known 3-D tomographic mapping techniques, such as those utilized in medical or industrial computed tomography systems. The velocity information is extracted and mapped, as shown in FIG. 8. Similarly, a 3-D temperature map T can be constructed utilizing the time of flight data, as will be described in greater detail herein.

After all of the transceiver/transducers 32, 34 in a planar array have fired acoustic signals the respective line-of-sight flow path time-of-flight data are used to derive absolute velocity in the gas flow path in step 560, once corrected for the thermodynamic effects of temperature, gas constant and the speed of sound, as described in greater detail below.

Flow velocity measurement accuracy potentially decreases as flow velocity approaches the speed of sound, assuming constant gas temperature in the velocity measurements. Flow velocity below a Mach number of approximately 0.5 is not believed to impact velocity measurement significantly. Therefore it is preferable, but not required, that measured flow velocities should be smaller than half of the local speed of sound that is measured. This method can accurately measure high temperature gas flows, including turbine engine gas flows, despite relatively high absolute velocities, because the local speed of sound increases with temperature.

Figure 6:
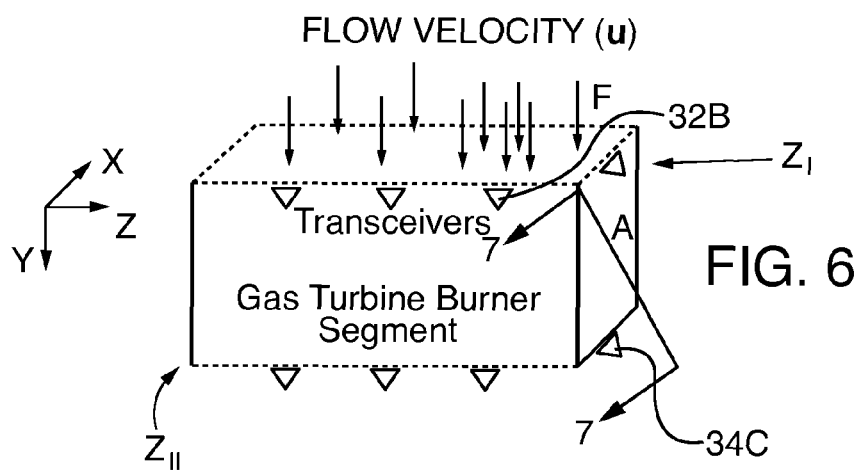
FIG. 6 is an exemplary schematic representation of gas flow velocity in the turbine combustor of FIG. 5 in the line-of-sight between acoustic sensors 32B and 34C.
Figure 7:
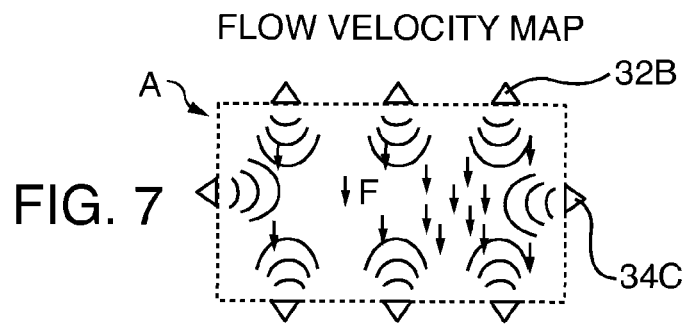
FIG. 7. is a cross-sectional slice A of the gas flow velocity of FIG. 6 taken along 7-7 thereof, which corresponds to the line-of-sight between acoustic sensors 32B and 34C.

Once acoustic time-of-flight data are available, they are used by the monitoring and control system 29 or other remote monitoring system to determine velocity along their respective acoustic paths in accordance with the remainder of the steps of FIG. 11. Referring to FIGS. 6 and 7, information sound propagation is linearly affected by the gas flow. Relative gas flow velocity for a given temperature, gas constant and speed of sound is determined by the known equation:

$$t_{BC} = \int_B^C \frac{1}{c(x, y, z) + \vec{p}_{BC} \cdot \vec{u}(x, y, z)} ds$$

Where:
$t_{BC}$ is the time-of-flight from the first transmitter B to the first sensor C;
c is the speed of sound in the gas flow for the temperature and gas constant;
$\vec{p}_{BC}$ is the unit vector along the first line of sound path A between B and C; and
$\vec{u}(x,y,z)$ is velocity vector in the gas flow.

The exemplary planar slice along the line-of-sound path A shows a simplified flow pattern. Referring again to the flow chart of FIG. 11, the relative gas flow velocity is corrected for thermodynamic temperature, gas flow and speed of sound influences, in order to derive absolute velocity in step 560. If the path temperature is available (step 520) its influence on the speed of sound can be corrected by known tomography methods, in order to derive the gas flow absolute velocity along the line-of-sound path. If the path temperature is not available, times-of-flight for forward (steps 500, 510) and reverse (steps 530, 540) acoustic signal transmission are acquired and used to extract the speed of sound without effect of the gas velocity in accordance with the following equations. The reverse time-of-flight from transducer/transceiver C to transducer/transceiver B is determined by the following equation, similar to that for the forward or downstream direction set forth above:

$$t_{CB} = \int_C^B \frac{1}{c(x, y, z) + \vec{p}_{BC} \cdot \vec{u}(x, y, z)} ds$$

The forward and reverse times-of-flight are added in accordance with the following equation:

$$t_{BC} + t_{CB} = \int_B^C \frac{2 \cdot c(x, y, z)}{c(x, y, z)^2 - \vec{p}_{BC} \cdot \vec{u}(x, y, z)^2} ds$$

Given that the square of the speed of sound c is much greater than the square of the gas flow velocity u, the equation is reduced to:

$$t_{BC} + t_{CB} \approx \int_B^C \frac{2}{c(x, y, z)} ds$$

where:
 $t_{BC}$ is the time of flight from the first transceiver/transducer B to the second transceiver/transducer C;
 $t_{CB}$ is the time of flight from the second transceiver/transducer C to the first transceiver/transducer B;
 c is the speed of sound in the gas flow for the temperature and gas constant;
 $\vec{p}_{BC}$ is the unit vector along the first line of sound path; and
 $\vec{u}(x,y,z)$ is the velocity vector in the gas flow.

The speed of sound c determined in step 550 of FIG. 11 is then used to correct the downstream time-of-flight data for that speed of sound in step 560. The corrected downstream time-of-flight data are used to determine gas flow absolute velocity in step 570. Where the path temperature T along a line-of-flight is not known, the same speed of sound c determined in step 550 is utilized in some embodiments of the invention to determine T, using the previously described isentropic speed of sound relationship $$c(x, y, z) = (\gamma \cdot R \cdot T)^{\frac{1}{2}},$$

γ, R and c(x,y,z) are now known. In a similar manner to the path velocity determinations previously described, once all the path temperatures T are known from each receiver/transmitter unit back and forth, there will be 64 (assuming exemplary 8-sensor case) iso-temperature tines in 3-dimensions. Then using known 3-D tomographic mapping techniques, the 3-dimensional temperature distribution is mapped.

Advantageously the active acoustic temperature and velocity measurements are performed simultaneously in real time, thus mapping both gas flow temperature (3-D or alternatively the 2-D mapping of FIG. 9) and 3-D gas flow velocity (FIG. 8). An exemplary acoustic signal transmission and reception timing sequence to perform simultaneous velocity and temperature measurement is to emit an acoustic signal with a transceiver/transducer on a first array plane (e.g., 32A at $Z_I$). The corresponding transversely oriented transceivers/transducers on an axially spaced opposed second plane (e.g., 34B-H $Z_{II}$) receive the signal for velocity processing and/or temperature processing, if 3-D temperature measurement is utilized. It only 2-D temperature measurement is utilized the remainders of the transceiver/transducers on the first array plane (e.g., 32B-H at ZI) receive the signal for temperature processing. As previously noted the transmission and receiving process also can be accelerated by utilizing unique signal transmission patterns for each transceiver/transducer. There are tradeoffs associated with use of 2-D or 3-D temperature measurement. Where 3-D temperature measurement techniques are utilized, accuracy of both temperature and velocity map may not be the most desired in case of gas velocities of Mach 0.3 or above as the approximation shown in the equation $$t_{BC} + t_{CB} \approx \int_B^C \frac{2}{c(x, y, z)} ds$$

may be less accurate in those velocities ranges, because there are no independently determined temperature reference values. However, independent temperature T reference values may be determined, using a pair of axially separated 2-D acoustic signal sets and two individual acoustic temperature maps determined with the respective 2-D time-of-flight signal sets. The 2-D temperature maps are in turn interpolated to create a volumetric temperature map. This volumetric map will be used to provide the temperature values T utilized in the isentropic speed of sound equation, along with the known gas constant R and specific heat ratio γ to extract speeds of sound c. The speed of sound is then used to extract the velocity vectors u(x,y,z). Once the velocity vectors are extracted the velocity components can be mapped, eliminating the limitation of below Mach 0.3 gas velocities inherent in the previously descried 3-D velocity and temperature mapping methods.

Combustor active gas flow velocity or velocity/temperature monitoring utilizing the system and method embodiments described herein with arrays of commonly utilized acoustic sensors is believed to provide faster velocity and temperature change response than known velocity and temperature monitoring systems. In accordance with embodiments of the invention one array of commonly utilized, reliable acoustic transceiver/transducer sensor-transmitters or arrays of separate discrete acoustic sensors and transmitter pairs can be placed in a combustion flow path under field conditions and monitored to provide active, real time simultaneous velocity and temperature data and anomaly detection that are all useful for monitoring and control of combustion power generation equipment, such as industrial gas turbines.

Performance Measurement Using Mass Flow Rate

An active acoustic method and system is now described to measure performance of a gas turbine engine using temperature, velocity and mass flow rate in the flow path. The method may be used, for example, in the exhaust section 18 of a gas turbine engine (FIG. 1). The method and system may alternately be used to measure mass flow at other sections of the gas turbine engine, such as an intake to the compressor section 12. Mass flow measurements may further be made within a combustor section 20 or transition duct 27, which measurement is especially useful in combustor design.

By virtue of several dozen acoustic signals transmitted and received along line-of-sound paths across a gas volume, very accurate averaged temperatures and velocities are obtained in real time. For each measurement cycle, each line-of-sound path is assigned a single value of temperature that represents the mean value of temperature along that line. Similarly, in the case of velocity, each line-of-sound path is assigned mean velocity vector along that line. Those values are inferred based on the speed, of sound along each line-of-sound path. Once the temperatures are known, they are mapped tomographically into a 3-dimensional volume, creating a 3-dimensional temperature map of the volume. As for the velocity, each line-of-sound path vector is decomposed into three dimensions that are tomographically mapped in each plane. The locations of the transceivers (transmit/receive units) are optimized to achieve highest possible signal-to-noise levels as this contributes to the accuracy of the measurement.

Described below is a sensor system and method for measuring total performance on a gas turbine engine exhaust by simultaneously mapping temperature and velocity and measuring the total mass flow rate. The described sensor system and method utilize the general concept of simultaneous temperature and velocity mapping in a hot gas flow using acoustic tomography as previously described in this disclosure.

The acoustic 3-dimensional measurement of both a temperature map and a velocity map are described above with reference to FIGS. 5-11. A single transceiver 32A in a first measurement plane $Z_I$ (FIG. 5) transmits to a plurality of transceivers 32B-32H in the same measurement plane $Z_I$ as well as to a plurality of transceivers 34B-34H in a second measurement plane $Z_{II}$. Line-of-sound paths from the transceiver 32A to transceivers 34B-34H are shown in FIG. 5.

The transceivers fire either with slightly different acoustic signals simultaneously, or with the same acoustic signal one after the other. Those or similar arrangements are necessary to track the firing transceiver for time-of-flight measurements. The measurements are made continuously and are processed in parallel using complex algorithms and high power computational hardware, such that the temperature and velocity values are available in real time. The calculation of temperatures and velocities from the time-of-flight measurements is described above.

The measurement and mapping of temperature on a plane such as plane $Z_I$ of FIG. 5, using an array of acoustic transceivers, is described above with reference to FIGS. 9 and 10. A similar measurement is made simultaneously for plane $Z_{II}$, thus providing two 2-dimensional maps of temperature at each end of the interrogated gas volume in the engine exhaust.

As described above with reference to FIG. 11, to determine a gas velocity map, times of flight are measured for line-of-sound paths across the measurement volume by transmitting sound back and forth along each line-of-sound path and taking advantage of dependence of the results from the constant environmental conditions. The measured time of flight information is a function of the speed of sound and the gas flow velocity vector along each line-of-sound path. The speed of sound, however, is directly dependent on temperature, which has been mapped in the previous operation. That temperature information is used to extract gas velocity vectors along each line-of-sound path. The velocity vectors are then decomposed and mapped using tomographic algorithms. The procedure is repeated continuously to provide accurate temperature and velocity maps in real time with statistical smoothing and approximately 1-second update rates. If flows are highly unsteady (turbulent) a longer time averaging period may be required (5-10 seconds) to increase the accuracy of the velocity maps.

In the same algorithm, an accurate mass flow rate is extracted from the available data. In addition to the temperature map, the velocity map and the gas velocity vectors, several other inputs are used by the algorithm. A model of the duct geometry surrounding the interrogated gas volume is made available as an initial condition of the algorithm. Additionally, static pressure information is measured at one or more locations at the duct wall. In embodiments of the disclosure, the static pressure may be measured by sensors or pressure taps incorporated into the acoustic transceivers, or by separate devices. Similarly, temperatures near the duct wall may be measured using thermocouples or other devices to provide boundary conditions for the mapping algorithms. The mass flow rate is computed as follows:

A gas volumetric flow rate $\dot{V}$ (m³/s) is computed from the resultant gas velocity vectors (magnitude and angle) (m/s) along the line-of-sound paths. In this discussion, examples of unites used to express certain values are provided for ease of understanding. The example units do not limit the disclosure. The velocity vectors are evaluated throughout the interrogated gas volume. A volumetric flow rate is equal to the velocity of the gas times the flow area. The volumetric flow rate of the gas is computed by multiplying an average gas velocity (m/s) in the interrogated gas volume by a cross sectional area of the flow (m²). Alternatively, and more accurately, the volumetric flow rate $\dot{V}$ may be computed by integrating velocities from the velocity map over the interrogated gas volume of the flow to produce a 3-dimensional map of volumetric flow rates.

The gas density ρ (kg/m³) is computed from the speed of sound in the gas and the measured static pressure information. The gas density is defined as:

$$\rho = \frac{m}{V}$$

where m is a mass of the gas and V is a volume of the gas. Substituting using the ideal gas law:

$$\rho = \frac{mP}{nRT}$$

wherein P is a static pressure (Pa), in is a mass of the gas (kg), n is a number of gas molecules, R is the universal gas constant ((m³·Pa)/(mole·K)) and T is temperature (deg. K). Substituting the speed of sound in the gas using the relationship $$c = \sqrt{\frac{\gamma RT}{M}}$$

where c is the speed of sound, M is a molecular weight of the gas and γ is a specific heat ratio of the gas:

$$\rho = \frac{\gamma P}{c^2}$$

As in the case of the volumetric flow rate $\dot{V}$, the gas density ρ may be calculated as an average value over the interrogated volume, or, more accurately, the gas density ρ may be computed by integrating the speed of sound c over the interrogated volume to produce a 3-dimensional map of gas density.

The gas mass flow rate $\dot{m}$ (in kg/sec) is calculated using above parameters as:

$$\dot{m} = \rho \cdot \dot{V}$$

The mass flow rate may be calculated by simply multiplying an average gas density within the interrogated volume by an average volumetric flow rate within the volume. More precise results are obtained by integrating the above mass flow rate computation over the interrogated volume using maps of the gas density and the volumetric flow rate over the interrogated volume. That approach takes into consideration variations in gas density and volumetric flow rate within the volume.

Additional accuracy may be obtained by continuously performing the above computations, and statistically smoothing the results over the required response time. In that way, the impacts of instability in the gas flow and transient variations in the flow profile are minimized. Further, the nature of the time-of-flight estimation is that a missed detection results in arbitrary results. For example, a delay of 110 could be detected as 643. Such potentially large outliers could strongly bias the resulting mass flow rate determination. While simple averaging would reduce that bias, it would be better to use a statistical method that disregards or reduces the impact of outliers. One very simple example is to use the median of the data. Another simple example is to compute the mean of a 20%<x<80% range of the data. Other statistical smoothing techniques that reduce the impact of outliers may also be used. For highly unsteady gas flows a larger time interval will be used for data integration to converge the mass flow to a more accurate reading.

One measure of performance of a gas turbine engine is power output. Gas turbine engine power output may be expressed as the rate of heat energy added in the combustors minus the rate of compressor energy minus the rate of exhaust energy loss minus the rate of mechanical energy loss. That expression may be evaluated by accurately measuring both flow rate and temperature in real time, and using the values to calculate the values in the above heat balance equation.

Heat energy added in the combustor may be calculated by extracting turbine inlet temperature from the combustor exhaust temperature measured using the above techniques. The rate of compressor energy is determined by the mass flow rate through the compressor, which is extracted using the above techniques for mass flow measurement in the combustors. The rate of exhaust energy loss is determined by accurately measuring exhaust temperatures using 2- or 3-dimensional methods. Mechanical energy loss on the shaft is known; alternatively, performance can be determined without considering the mechanical losses.

Figure 12:
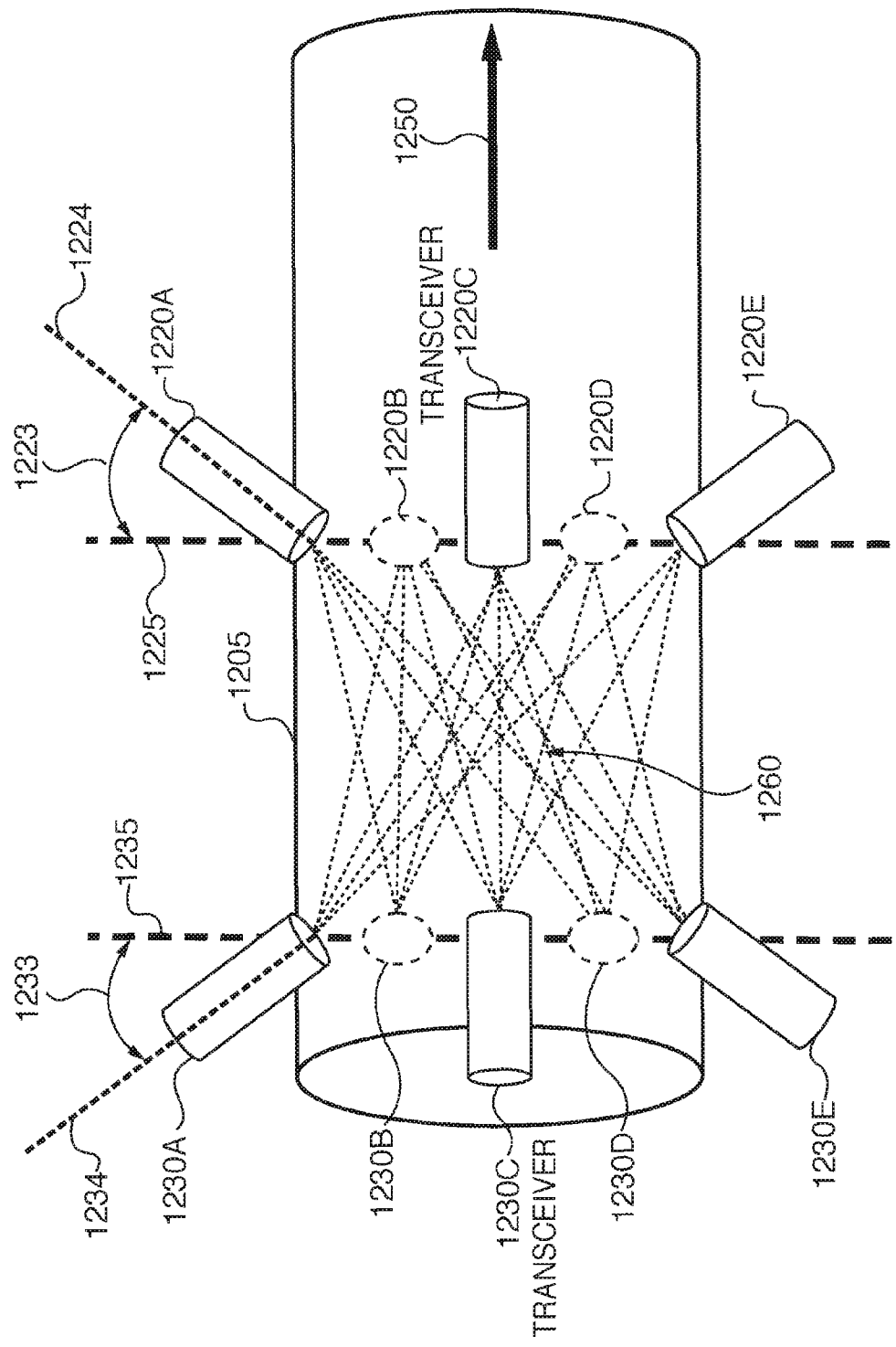
FIG. 12 is a schematic perspective view of exemplary sonic sensor arrays used by the gas flow monitoring system to measure mass flow rate in a gas turbine engine in accordance with embodiments of the invention.

In one embodiment of the present disclosure, a transceiver arrangement for determining a mass flow rate of an exhaust gas in an interrogated gas volume 1205 of a gas turbine engine exhaust component, shown in FIG. 12, includes two measurement planes 1225, 1235 arranged transversely to an exhaust gas flow direction 1250. In the plane 1225, at least eight transceivers including transceivers 1220A-4220E are evenly spaced around the circumference of the exhaust component; in plane 1235, at least eight transceivers including transceivers 1230A-1230E are similarly arranged. The greater the number of transceivers in each measurement plane, the greater the spatial resolution on the temperature and velocity maps.

The transmitting and receiving functions of the transceivers 1220A-1220E and 1230A-1230E are somewhat directional, and each transceiver therefore has a transmitting/receiving axis 1224, 1234. The transceivers are arranged such that the transmitting/receiving axes 1224, 1234 of the transceivers are included at angles 1223, 1233 to the measurement planes 1225, 1235. In each case, the angles 1223, 1233 are selected such that the transmitting/receiving axis of each transceiver is aligned as closely as possible to the lines of sound 1260 defined by that transceiver.

Because of the range of orientations of line of sound paths defined by a given transceiver, it would be impossible to perfectly align the transmitting/receiving axis 1224 with all the lines of sound defined by that transceiver. For example, the transceiver 1220A defines line of sound paths with transceivers 1230B, 1230C, 1230D and 1230E. Additionally, line of sound paths (not shown) are defined between transceiver 1220A and other transceivers placed within the measurement plane 1225. To minimize the alignment errors of the transceiver with each of its defined lines of sound, the transceiver 1220A is placed an angle 1223 to the measurement plane 1225. To that end, the angle 1223 may be selected such that the sum of alignment errors for all the lines of sound defined by a given transceiver may be minimized. Alternatively, the sum of the squares of the alignment errors is minimized. In another example, the largest alignment error is minimized.

As defined herein, the "angle" of a transceiver axis to a measurement plane is a positive value indicating inclination, but not direction. For example, as defined, the angle 1223 as shown in FIG. 12 is substantially equal to the angle 1233.

In embodiments of the invention, all of the transceivers are installed to have equal angles from the measurement plane. The measurement planes 1225, 1235 are spaced apart from each other at a distance resulting in angles of the transceiver axes to the measurement planes of approximately 25-45 degrees for accurate results. The exact inclination of the transceivers is determined based on the installation.

In one embodiment, a static pressure sensor and a thermocouple are incorporated in each transceiver to record the boundary conditions for the measurements and to provide pressure data for the density computation.

The acoustic transmitters and receivers should be selected according to the expected highest temperatures on the turbine exhaust. For example, the transmitters may be electrodynamic (speaker), piezo-electric, mechanical (horn or whistle) or spark gap type. The latter two are more suitable for higher temperature applications. The acoustic receivers may be capacitive (membrane—both externally or internally polarized), piezo electric, piezo-resistive, fiber-optic based on interferometry (e.g., Fabry-Pérot interferometry), etc. Piezo resistive sensors made using polymer derived ceramics (e.g., SiCN) and fiber-optic based sensors using quartz or sapphire fibers may be used for up to very high gas temperatures.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The exemplary engine 10 and exemplary combustor 1200 are shown by way of illustration and not by way of limitation, to clearly describe certain features and aspects of the present invention set out in greater detail herein. However, the various aspects of the present invention described more fully herein may be applied to various combustion engines to monitor and/or detect the occurrence of combustion anomalies. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for actively monitoring a mass flow rate of gas through a gas turbine engine, comprising:
    receiving output signals generated by a plurality of acoustic sensors located on a first measurement plane, the output signals being indicative of thermoacoustic oscillations having contributions from acoustic signals from at least one acoustic transmitter in a gas flow path of the gas turbine engine wherein the at least one acoustic transmitter is located on a second measurement plane spaced apart from the first measurement plane wherein the first and second measurement planes are arranged transverse to the gas flow path and wherein the first and second measurement planes define a measurement zone that includes anticipated temperature variations in the gas flow path, the plurality of acoustic sensors and the at least one acoustic transmitter defining line-of-sound paths relative to each other in the gas flow path wherein the line-of-sound paths are located within the measurement zone;
    determining, using a computer processor, a time-of-flight for the acoustic signals traveling along each of the line-of-sound paths;
    processing, by the computer processor, the times-of-flight for the acoustic signals traveling along each of the line-of-sound paths to determine speeds of sound and gas flow velocity vectors along each of the line-of-sound paths;
    computing, by the computer processor, a volumetric flow rate based on the of gas flow velocity vectors in the gas flow path and further based on a flow path geometry;
    computing, by the computer processor, a gas density based on the speeds of sound along each of the line-of-sound paths and further based on a measured static pressure in the gas flow path; and
    computing, by the computer processor, the gas mass flow rate based on the gas density and the volumetric flow rate.

2. The method of claim 1, the computing of the gas mass flow rate being described by the equation:

$$\dot{m} = \rho \cdot \dot{V}$$

where $\dot{m}$ is the mass flow rate, $\rho$ is the gas density and $\dot{V}$ is the volumetric flow rate.

3. The method of claim 1, the computing of the gas density being described by the equation:

$$\rho = \frac{mP}{nRT}$$

where $\rho$ is the gas density, m is mass of the gas, P is the measured static pressure in the gas flow path, n is a number of gas molecules, R is a universal gas constant and T is a mapping of a temperature of the gas.

4. The method of claim 1, the determining of the time-of-flight being described by the equation:

$$t_{BC} = \int_B^C \frac{1}{c(x, y, z) + \vec{p}_{BC} \cdot \vec{u}(x, y, z)} ds$$

where:
    $t_{BC}$ is the time of flight from a transmitter B to a sensor C;
    c is a speed of sound in the gas flow for a temperature and gas constant;
    $\vec{p}_{BC}$ is a unit vector along a line of sound path; and
    $\vec{u}(x, y, z)$ is a velocity vector in the gas flow.

5. The method of claim 1, wherein determining times of flight for the acoustic signals further comprises statistically smoothing a data series to reduce an impact of outliers.

6. The method of claim 1, wherein computing a volumetric flow rate comprises computing an average volumetric flow rate for the gas flow path.

7. The method of claim 1, wherein computing a volumetric flow rate comprises computing a volumetric flow rate mapping including volumetric flow rate values for a plurality of locations within the gas flow path.

8. The method of claim 1, wherein computing a gas density comprises computing an average gas density for the gas flow path.

9. The method of claim 1, wherein computing a gas density comprises computing a gas density mapping including gas density values for a plurality of locations within the gas flow path.

10. The method of claim 1, wherein:
    transmitting acoustic signals from the at least one acoustic transmitter in a gas flow path of the gas turbine engine comprises transmitting the acoustic signals from a transmitter oriented at an angle of between 25 and 45 degrees to a first transverse plane through the flow path; and
    receiving output signals generated by a plurality of acoustic sensors comprises receiving the output signals generated by a plurality of acoustic sensors oriented at an angle of between 25 and 45 degrees to second a transverse plane through the flow path offset from the first transverse plane.

11. The method of claim 1, further comprising:
    evaluating a real-time performance of the gas turbine engine by determining a gas turbine power output using instantaneous inputs of the gas mass flow rate, a turbine exhaust energy and a turbine combustion energy.

12. The method of claim 1, wherein:
    transmitting acoustic signals from at least one acoustic transmitter further comprises transmitting acoustic signals from at least one acoustic transceiver, each of the at least one acoustic transceivers comprising an acoustic transmitter and an acoustic sensor; and
    receiving output signals generated by a plurality of acoustic sensors further comprises receiving output signals from a plurality of acoustic transceivers, each one of plurality of acoustic transceivers comprising an acoustic transmitter and an acoustic sensor.

13. The method of claim 12, further comprising:
    receiving the measured static pressure in the gas flow path from static pressure sensors located on the acoustic transceivers.

14. The method of claim 1, where receiving output signals generated by a plurality of acoustic sensors comprises receiving output signals generated by at least 8 acoustic sensors.

15. The method of claim 1, where the plurality of acoustic sensors are acoustic sensors selected from a group consisting of capacitive sensors, piezoresistive sensors and fiber optic-based sensors.

16. The method of claim 1, where the at least one acoustic transmitter is an acoustic transmitter selected from a group consisting of an electrodynamic speaker, a piezoelectric acoustic transmitter, a mechanical gas-flow-activated acoustic transmitter and a spark gap acoustic transmitter.

17. A system for actively monitoring a mass flow rate of gas through a gas turbine engine, comprising:
    at least one acoustic transmitter mounted to the gas turbine engine for transmitting acoustic signals in a gas flow path of the gas turbine engine wherein the at least one acoustic transmitter is located on a first measurement plane;
    a plurality of acoustic sensors mounted to the gas turbine engine for receiving thermoacoustic oscillations having contributions from the acoustic signals in the gas flow path, wherein the plurality of acoustic sensors is located on a second measurement plane spaced apart from the first measurement plane wherein the first and second measurement planes are arranged transverse to the gas flow path and wherein the first and second planes define a measurement zone that includes anticipated temperature variations in the gas flow path, the plurality of acoustic sensors being further for generating output signals indicative of the thermoacoustic oscillations, the plurality of acoustic sensors and the at least one acoustic transmitter defining line-of-sound paths relative to each other in the gas flow path of the gas turbine engine wherein the line-of-sound paths are located within the measurement zone;
    a processor connected to the plurality of acoustic sensors for receiving the output signals; and
    computer readable media containing computer readable instructions that, when executed by the processor, cause the processor to perform the following operations:
        determining a time-of-flight for the acoustic signals traveling along each of the line-of-sound paths;
        processing the times-of-flight for the acoustic signals traveling along each of the line-of-sound paths to determine speeds of sound and gas flow velocity vectors along each of the line-of-sound paths;
        computing a volumetric flow rate based on the of gas flow velocity vectors in the gas flow path and further based on a flow path geometry;
        computing a gas density based on the speeds of sound along each of the line-of-sound paths and further based on a measured static pressure in the gas flow path; and
        computing the gas mass flow rate based on the gas density and the volumetric flow rate.

18. The system of claim 17, wherein computing a volumetric flow rate comprises computing a volumetric flow rate mapping including volumetric flow rate values for a plurality of locations within the gas flow path.

19. The system of claim 17, wherein computing a gas density comprises computing a gas density mapping including gas density values for a plurality of locations within the gas flow path.

20. A non-transitory computer-readable medium having computer readable instructions stored thereon for execution by a processor to perform operations for actively monitoring a mass flow rate of gas through a gas turbine engine, the operations comprising:
    receiving output signals generated by a plurality of acoustic sensors located on a first measurement plane, the output signals being indicative of thermoacoustic oscillations having contributions from acoustic signals from at least one acoustic transmitter in a gas flow path of the gas turbine engine wherein the at least one acoustic transmitter is located on a second measurement plane spaced apart from the first measurement plane wherein the first and second measurement planes are arranged transverse to the gas flow path and wherein the first and second measurement planes define a measurement zone that includes anticipated temperature variations in the gas flow path, the plurality of acoustic sensors and the at least one acoustic transmitter defining line-of-sound paths relative to each other in the gas flow path wherein the line-of-sound paths are located within the measurement zone;
    determining, using the processor, a time-of-flight for the acoustic signals traveling along each of the line-of-sound paths;
    processing, by the processor, the times-of-flight for the acoustic signals traveling along each of the line-of-sound paths to determine speeds of sound and gas flow velocity vectors along each of the line-of-sound paths;
    computing, by the processor, a volumetric flow rate based on the of gas flow velocity vectors in the gas flow path and further based on a flow path geometry;
    computing, by the processor, a gas density based on the speeds of sound along each of the line-of-sound paths and further based on a measured static pressure in the gas flow path; and
    computing, by the processor, the gas mass flow rate based on the gas density and the volumetric flow rate.

* * * * *